United States Patent
Endo et al.

(10) Patent No.: US 8,238,019 B2
(45) Date of Patent: Aug. 7, 2012

(54) PROJECTION APPARATUS WITH COHERENT LIGHT SOURCE

(75) Inventors: Taro Endo, Chofu (JP); Yoshihiro Maeda, Hachioji (JP); Hirotoshi Ichikawa, Hachioji (JP); Yoshiaki Horikawa, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 535 days.

(21) Appl. No.: 12/231,911

(22) Filed: Sep. 5, 2008

(65) Prior Publication Data

US 2009/0009851 A1 Jan. 8, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/967,814, filed on Sep. 6, 2007.

(51) Int. Cl.
*G02B 26/00* (2006.01)
*G02B 26/08* (2006.01)
*G02F 1/29* (2006.01)

(52) U.S. Cl. .................................... 359/292; 359/298

(58) Field of Classification Search .......... 359/290–292, 359/295, 298, 237, 242
See application file for complete search history.

(56) References Cited

U.S. PATENT DOCUMENTS

| | | | | |
|---|---|---|---|---|
| 5,196,875 | A * | 3/1993 | Stuckler | 353/97 |
| 5,535,047 | A | 7/1996 | Hornbeck | |
| 6,394,606 | B1 * | 5/2002 | Miyawaki et al. | 353/20 |
| 6,404,414 | B2 * | 6/2002 | Ishii | 345/90 |
| 6,885,494 | B2 | 4/2005 | Patel et al. | |
| 7,106,491 | B2 * | 9/2006 | Meyer et al. | 359/291 |
| 2002/0122260 | A1 | 9/2002 | Okazaki et al. | |
| 2005/0141076 | A1 | 6/2005 | Bausenwein et al. | |
| 2007/0121191 | A1 | 5/2007 | Pan | |

OTHER PUBLICATIONS

ISBN 013501545, 1993, Pedrotti et al., p. 137.

* cited by examiner

*Primary Examiner* — Ricky Mack
*Assistant Examiner* — Brandi Thomas
(74) *Attorney, Agent, or Firm* — Bo-In Lin

(57) ABSTRACT

The present invention discloses a projection apparatus comprising: a light source for emitting illumination light; a mirror device comprising a plurality of mirrors for generating an image by reflecting the illumination light toward a projecting direction by means of a deflecting operation; and a projection optical system which is placed in the optical axis of reflection light in the projecting direction of the illumination light incident to the mirror device and which projects the reflection light, wherein the optical axis of the illumination light incident to the mirror device and the optical axis of the reflection light in the projecting direction forms an angle that is larger than the expansion angle α of the flux of the illumination light that satisfies NA=n*sin α, where NA is the numerical aperture of the flux of the illumination light, and n is the reflectance.

6 Claims, 21 Drawing Sheets

PROJECTION APPARATUS WITH COHERENT LIGHT SOURCE

This is a Non-provisional application of a pending U.S. Patent Provisional Application No. 60/967,814 filed on Sep. 6, 2007. The Patent Application 60/967,814 is a Continuation In Part (CIP) Application of a pending U.S. patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are Ser. No. 10/698,620 filed on Nov. 1, 2003 now abandoned, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates to an image projection system implemented with a mirror device manufactured by the field of Micro Electro Mechanical Systems (MEMS) technology. More particularly, this invention relates an image projection system wherein the optical axis of the illumination light incident to the mirror device and the optical axis of the reflection light in the projecting direction forms an angle that is larger than the expansion angle $\alpha$ of the flux of the illumination light that satisfies $NA=n*\sin \alpha$, where NA is the numerical aperture of the flux of the illumination light, and n is the reflectance.

2. Description of the Related Art

After CRT technology dominated the display industry for over 100 years, Flat Panel Display (hereafter FPD) and Projection Display attained popularity because of the improved form-factor and a larger size screen. In several types of projection displays, projection displays using micro-displays are gaining recognition by consumers because of high performance image quality and lower cost advantage compared to the FPDs. There are two types of micro-displays used for projection displays in the market: One is a micro-LCD (Liquid Crystal Display), and the other is a display using mirror technology such as a mirror device. Since the mirror device uses un-polarized light, the mirror device has an advantage in brightness over the polarized light using micro-LCD.

Even though there are significant advances in the technologies implementing an electromechanical mirror device as a spatial light modulator (SLM) in recent years, there are still limitations and difficulties when a spatial light modulator is employed to provide a high quality image. Specifically, when the images are digitally controlled, the image quality is adversely affected due to the fact that the images are not displayed with a sufficient number of gray scales.

Electromechanical mirror devices are drawing considerable interest as the spatial light modulators (SLM). The electromechanical mirror device includes "a mirror array" arranging a large number of mirror elements. In general, the mirror elements, ranging in number from 60,000 to several millions, are arranged on the surface of a substrate in an electromechanical mirror device.

The mirror device includes multiple mirror elements to function as a spatial light modulator (SLM). Each mirror element includes a mirror and electrodes. A voltage applied to the electrode(s) generates a coulomb force between the mirror and the electrode(s), thereby making it possible to control the incline of the mirror and the mirror is "deflected," according to a common term used in this specification for describing the operational condition of a mirror element.

When a mirror is deflected with a voltage applied to the electrode(s) to control the mirror, the deflected mirror also changes the direction of the reflected light in reflecting an incident light. The direction of the reflected light is changed in accordance with the deflection angle of the mirror. The present specification refers to a state of the mirror when incident light is reflected towards a projection path designated for image display as an "ON light", while referring to a light reflected in a direction other than the designated projection path for image display as an "OFF light".

One of the spatial light modulators known as a Digital Mirror Device (DMD) is formed and supported on a device substrate. The DMD includes a plurality of mirror elements for modulating incident light emitted from a light source and for controlling the reflecting direction of the incident light by deflecting mirrors for projecting an images through an image projection system. A projection apparatus often employs a discharge lamp light source, such as a mercury lamp or a xenon lamp. The image projection system also employs a DMD to control the reflecting direction of light with the mirrors of the DMD, so that an ON light incident to a projection lens does not overlap with an OFF light not incident to the projection lens. Thereby, the contrast of a projection image is enhanced.

For example, a specific reference document, i.e., U.S. Pat. No. 6,885,494, discloses that degradation in the contrast and the image quality of an image is caused by the ON light and OFF light, which are reflected by a mirror, overlapping with each other. Further, the document discloses a technique for improving the aforementioned problem by setting the difference in deflection angles between the ON light and OFF light states at 28 degrees.

Meanwhile, a projection apparatus using a DMD disclosed by USA-based Texas Instruments, Inc. is configured to set the deflection angles of the mirror of the DMD at ±12 clockwise (CW) relative to the initial state of the mirror, corresponding to the ON and OFF lights respectively. Such a configuration separates a projection light path of the ON light from an OFF light path directing toward a light shield member. The configuration thus provides separate light paths without causing the f/2.4 illumination light flux emitted from a light source modulated as the ON light and OFF light to overlap with one another. Further, the apparatus is configured to place mirror elements so as to prevent the reflection light or diffraction light generated by a mirror in the initial state from heading towards the projection light path. As such, the deflection angle of the mirror of the conventional DMD is designed to prevent light fluxes, which are determined by the F-number of a projection lens so as to obtain a sufficient level of resolution by effectively utilizing the light output from a discharge lamp light source, from overlapping with one another.

An image projection apparatus may also use a light source with a coherent characteristic such as a laser light source.

The laser light from a laser light source has a coherent characteristic because the laser light has a uniform wavelength and phase. The laser light therefore can project with a high directivity and maintains continuously along the optical path as parallel light beam. More recently, there has been much progress in the development of a compact, high-output laser light source.

A more compact optical system, compared to that of a projection apparatus comprising a discharge lamp and a spatial light modulator with a smaller deflection angle of mirror, is desired in order to display an image with high resolution.

The utilization of a laser light source for a projection apparatus, however, introduces a diffraction phenomenon due to the high degree of coherence. As further explained below, this phenomenon-affects image quality.

Particularly, a spatial light modulator, such as a DMD includes mirror elements arranged as mirror element arrays in constant intervals functioning similar to a diffraction grating. A diffraction phenomenon occurs when the light is reflected by the spatial light modulator in a projection apparatus with a combination the spatial light modulator and the coherent light source. As a result, such diffraction light is projected to a projection light path thus causes the problem of inadvertently increasing the overall brightness of the images. For this reason, there is a technical issue concerning a device configuration to prevent diffraction light from entering the projection light path.

There are many additional technical problems related to the application of the DMD in an image projection system, such as diffraction of light caused by a through hole for mounting a mirror onto a post, the reflection of light from the gap the between adjacent mirrors and by the edges of a mirror, and diffusion of the OFF light that may interfere with the image projection light. Consequently, it is important to properly configure an image projection system to prevent such extraneous light from entering a projection optical system in order to improve image quality, by enhancing the contrast of a projection image.

SUMMARY OF THE INVENTION

In consideration of the problems described above, one aspect of the present invention is to provide an image projection system with improved configuration to suppress the influence of the extraneous lights such that a degradation of image quality caused by diffraction light and/or diffused light generated by a spatial light modulator reflecting incident light may be reduced or eliminated. The image projection system includes a light source in a projection apparatus for projecting an illumination light to a spatial light modulator that includes a plurality of mirror elements formed on a device substrate for modulating the incident light by controlling the reflecting direction of the incident light emitted from the light source.

Another aspect of the present invention is to provide an improved image projection system that can be miniaturized to form a more compact projection apparatus than an image projection system using a discharge lamp light source.

A first exemplary embodiment of the present invention is a projection apparatus comprising a light source for emitting illumination light; a mirror device comprising a plurality of mirrors for generating an image by reflecting the illumination light toward a projecting direction by means of a deflecting operation; and a projection optical system which is placed in the optical axis of reflection light in the projecting direction of the illumination light incident to the mirror device and which projects the reflection light, wherein the optical axis of the illumination light incident to the mirror device and the optical axis of the reflection light in the projecting direction forms an angle that is larger than the expansion angle α of the flux of the illumination light that satisfies NA=n*sin α, where NA is the numerical aperture of the flux of the illumination light, and n is the reflectance.

A second exemplary embodiment of the present invention is the projection apparatus according to the first aspect, wherein the light source is a laser light source.

A third exemplary embodiment of the present invention is the projection apparatus according to the first aspect, wherein the light source is constituted by a plurality of laser light sources.

A fourth exemplary embodiment of the present invention is the projection apparatus according to the first aspect, wherein the mirror performs a deflecting operation on the basis of a deflection axis going through the approximate center of the mirror.

A fifth exemplary embodiment of the present invention is the projection apparatus according to the first aspect, wherein the mirror performs a deflecting operation on the basis of a deflection axis going through an edge of the mirror.

A sixth exemplary embodiment of the present invention is the projection apparatus according to the first aspect, wherein the mirror device comprises at least one electrode for each of the mirrors in order to control the deflecting operation.

A seventh exemplary embodiment of the present invention is the projection apparatus according to the first aspect, wherein the deflecting operation of the mirror device includes: an ON state for directing the reflection light towards the projection optical system, an OFF state for directing the reflection light away from the projection optical system, and an oscillation state for oscillating the mirror between the ON state and OFF state, wherein the reflection light incident to the projection optical system from the mirror device is used for a display in the oscillation state.

An eighth exemplary embodiment of the present invention is the projection apparatus according to the first aspect, wherein the deflection angle of the mirror is symmetrical between the clockwise (CW) direction and counterclockwise (CCW) direction relative to the initial state of the mirror.

A ninth exemplary embodiment of the present invention is the projection apparatus according to the eighth aspect, wherein the deflection angle of the mirror in the CW direction is an angle between 3 degrees and 13 degrees, and the deflection angle of the mirror in the CCW direction is an angle between −13 degrees and −3 degrees, where the CW direction is defined as positive (+) and the CCW direction as negative (−), with the initial state of the mirror defined as "0" degrees.

A tenth exemplary embodiment of the present invention is the projection apparatus according to the eighth aspect, wherein the deflection angle of the mirror in the CW direction is larger than 3 degrees, and the deflection angle of the mirror in the CCW direction is smaller than −3 degrees, where the CW direction is defined as positive (+) and the CCW direction as negative (−), with the initial state of the mirror defined as "0" degrees.

An eleventh exemplary embodiment of the present invention is the projection apparatus according to the eighth aspect, wherein the deflection angle of the mirror in the CW direction is approximately 3 degrees, and the deflection angle of the mirror in the CCW direction is approximately −13 degrees, where the CW direction is defined as positive (+) and the CCW direction as negative (−), with the initial state of the mirror defined as "0" degrees.

A twelfth exemplary embodiment of the present invention is the projection apparatus according to the eighth aspect, wherein the deflection angle of the mirror in the CW direction is larger than 13 degrees, and the deflection angle of the mirror in the CCW direction is smaller than −13 degrees, where the CW direction is defined as positive (+) and the CCW direction as negative (−), with the initial state of the mirror defined as "0" degrees.

A thirteenth exemplary embodiment of the present invention is the projection apparatus according to the first aspect, wherein the deflection angle of the mirror is asymmetrical between the clockwise (CW) direction and counterclockwise (CCW) direction relative to the initial state of the mirror.

A fourteenth exemplary embodiment of the present invention is the projection apparatus according to the thirteenth aspect, wherein the deflection angle of the mirror in the CW direction is an angle between 3 degrees and 13 degrees, and the deflection angle of the mirror in the CCW direction is an angle between −13 degrees and −3 degrees, where the CW direction is defined as positive (+) and the CCW direction as negative (−), with the initial state of the mirror defined as "0" degrees.

A fifteenth exemplary embodiment of the present invention is the projection apparatus according to the thirteenth aspect, wherein the deflection angle of the mirror in the CW direction is larger than 13 degrees, and the deflection angle of the mirror in the CCW direction is smaller than −13 degrees, where the CW direction is defined as positive (+) and the CCW direction as negative (−), with the initial state of the mirror defined as "0" degrees.

A sixteenth exemplary embodiment of the present invention is a projection apparatus comprising: a light source for emitting illumination light; a mirror device comprising a plurality of mirrors for generating an image by reflecting the illumination light to wards a projecting direction by means of a deflecting operation; and a projection optical system, which is placed in the optical axis of reflection light in the projecting direction of the illumination light incident to the mirror device and which projects the reflection light. Wherein, the deflection angle of the mirror device is set in a manner so that the contrast ratio of a video image projected onto a screen from the projection optical system is larger than the contrast ratio of a video image projected by the projection optical system when an angle formed by the optical axis of the illumination light incident to the mirror device and the optical axis of the reflection light in the projecting direction is approximately equal to the expansion angle α of the flux of the illumination light that satisfies $$NA = n^* \sin \alpha,$$

where NA is the numerical aperture of the flux of the illumination light, and the n is the reflectance.

A seventeenth exemplary embodiment of the present invention is a projection apparatus comprising: a light source for emitting illumination light; a mirror device comprising a plurality of mirrors for generating an image by reflecting the illumination light towards a projecting direction by means of a deflecting operation; and a projection optical system, which is placed in the optical axis of reflection light in the projecting direction of the illumination light incident to the mirror device and which projects the reflection light. Wherein, the expansion angle α of the illumination light is set in a manner so that the contrast ratio of a video image projected onto a screen from the projection optical system is larger than the contrast ratio of a video image projected by the projection optical system when an angle formed by the optical axis of the illumination light incident to the mirror device and the optical axis of the reflection light in the projecting direction is approximately equal to the expansion angle α of the flux of the illumination light that satisfies:

$$NA = n^* \sin \alpha,$$

where NA is the numerical aperture of the flux of the illumination light, and n is the reflectance.

An eighteenth exemplary embodiment of the present invention is a color projection apparatus comprising: a light source, a means for separating the light from the light source into a plurality of illumination lights with different colors, a plurality of mirror devices each comprising a plurality of mirrors for reflecting the illumination light towards a projecting direction by performing a deflecting operation, thereby generating an image, a means for color synthesizing the reflection lights, in the projecting direction, of the illumination light incident to a plurality of the mirror devices, and a projection optical system which is placed approximately in the optical axis of the synthesized light output from the color synthesizing means and which projects the synthesized light output from there. Wherein, the optical axis of the illumination light incident to the mirror device and the optical axis of the reflection light in the projecting direction forms an angle that is larger than the expansion angle α of the flux of the illumination light that satisfies $$NA = n^* \sin \alpha,$$

where NA is the numerical aperture of the flux of the illumination light, and N is the reflectance.

A nineteenth exemplary embodiment of the present invention is the projection apparatus according to the eighteenth aspect, wherein the means for color separation and the means for color synthesis are located in different regions of the apparatus, approximately on the same plane.

BRIEF DESCRIPTION OF THE DRAWINGS

The present invention is described in detail below with reference to the following Figures.

DESCRIPTION OF THE PREFERRED EMBODIMENTS

Image projection apparatuses implemented with a spatial light modulator, such as a transmissive liquid crystal, a reflective liquid crystal, a mirror array and other similar image modulation devices, are widely known. There are two primary types of spatial light modulators generally used in the projection apparatuses. The first type is a liquid crystal device for modulating the polarizing direction of incident light by sealing a liquid crystal between transparent substrates and applying a voltage to control the light passing through the liquid crystal. 1, The second type modulator is mirror device with control circuit for controlling and deflecting the miniature micro electro mechanical systems (MEMS) mirrors with electrostatic force and controlling the reflecting direction of illumination light.

The size of a mirror used in such a mirror device is between 4 μm and 20 μm on each side. The mirrors are placed on a semiconductor wafer substrate in such a manner as to minimize the gap between adjacent mirrors so that useless reflection light from the gap does not degrade the contrast of a demodulated image. A mirror device is manufactured by forming appropriate number of mirror elements with each mirror element reflecting one pixel of light as an image display element. The appropriate number of image display elements is determined to be in compliance to the resolution of a display specified by the Video Electronics Standards Association (VESA) and to the television-broadcasting standard. For example, in the case of configuring a mirror device in compliance with the WXGA (with the resolution of 1280× 768) as specified by the VESA and in which mirrors are arrayed in intervals (noted as "pitch" hereinafter) of 10 μm, the diagonal length of the display area will be configured at about 15.49 mm (0.61 inches), resulting in a sufficiently small mirror device.

Figure 7:
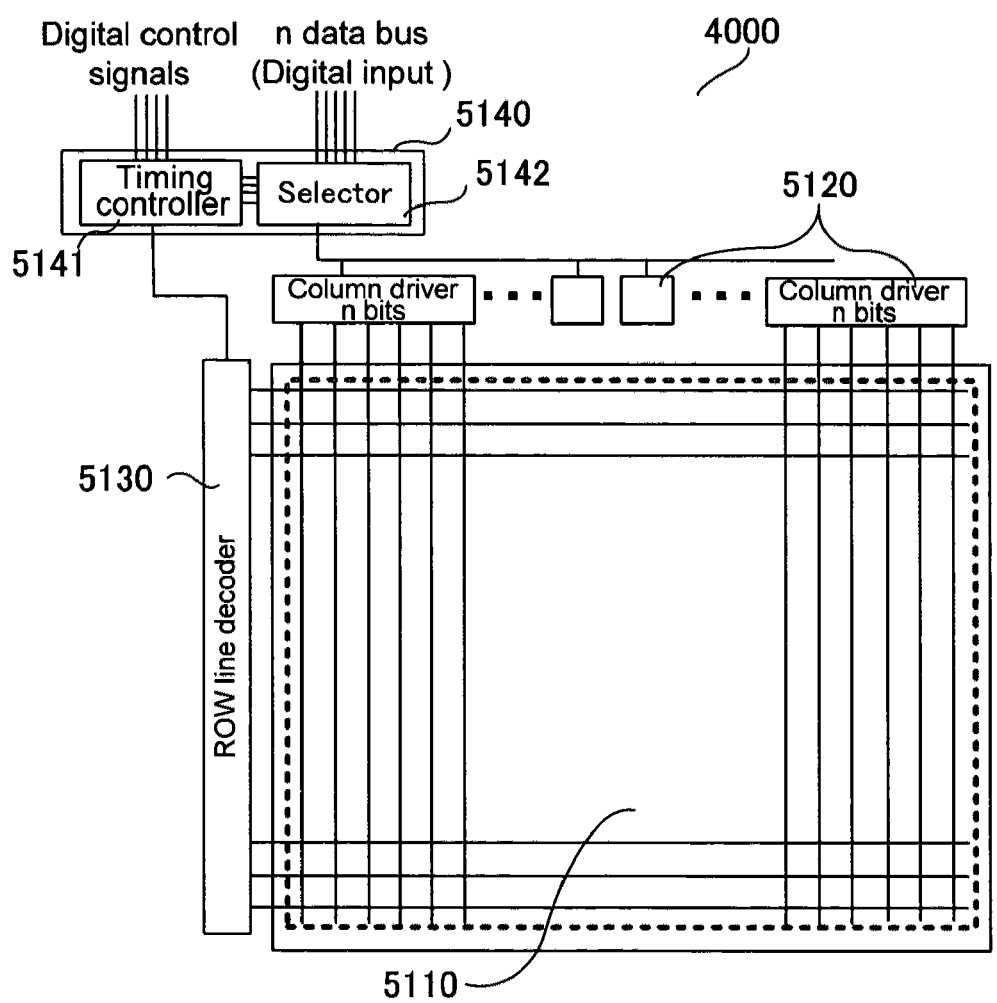
FIG. 7 is a conceptual diagram exemplifying the layout of the internal configuration of a spatial light modulator according to the embodiment of the present invention.

Referring to FIG. 7 for a description of the functional relationships among the numerical aperture (NA) NA1 of an illumination light path, the numerical aperture NA2 of a projection light path and the tilt angle α of a mirror for a projection apparatus implemented with a display device as described above.

Assuming that the tilt angle α of a mirror 1011 is 12 degrees. When a modulated light reflected by the mirror 1011 and incident to the pupil of the projection light path is set perpendicular to the device substrate 1012, the illumination light is incident from a direction inclined by an angle of 2α, that is, 24 degrees, relative to the perpendicular of the device substrate 1012. For the light beam reflected by the mirror to be most efficiently incident to the pupil of the projection lens, it is desirable for the numerical aperture of the projection light path to be equal to the numerical aperture of the illumination light path. If the numerical aperture of the projection light path is smaller than that of the illumination light path, the illumination light cannot be projected sufficiently into the projection light path. On the other hand, if the numerical aperture of the projection light path is larger than that of the illumination light path, the illumination light can be entirely projected, but then the projection lens becomes unnecessarily large, cause the projection apparatus to become very bulky and inconvenient to operate. Furthermore, in this case, the light fluxes of the illumination light and projection light must be directed apart from each other because the optical members of the illumination system and those of the projection system must be physically placed in separate locations in an image display system. From the above considerations, when a spatial light modulator with the tilt angle of a mirror at 12 degrees is used, the numerical aperture (NA) NA1 of the illumination light path and the numerical aperture NA2 of the projection light path are preferably set as follows:

$$NA1 = NA2 = \sin \alpha = \sin 12°$$

The F-number of the illumination light path is designated as Fa and the F-number of the projection light path is designated as Fb, the numerical aperture can be converted into an F-number as follows: $F1 = F2 = 1/(2*NA) = 1/(2*\sin 12°) = 2.4$ In order to maximize the projection of illumination light emitted from a non-polarized light source in the emission direction of light, such as a high-pressure mercury lamp or a xenon lamp, which are generally used for a projection apparatus, it's necessary to maximize the projecting angle of light onto the cross sectional surface of the light path of the illumination light. Since the numerical aperture of the illumination light path is determined by the specification of the tilt angle of the mirror the tilt angle of the mirror must be increased in order to increase the numerical aperture of the illumination light path.

However, there is a technical difficulty associated with a configuration by increasing the tilt angle of the mirror due to a fact that such system requires a higher drive voltage to drive the mirror. The electrostatic force F generated between the mirror and electrode is given by the following expression:

$$F = (\epsilon * S * V^2)/(2 * d^2)$$

where "S" is the area size of the electrode, "V" is a voltage, "d" is the distance between the electrode and mirror, and "ϵ" is the permittivity of vacuum.

The equation makes clear that the drive force is decreased in proportion to the second power of the distance d between the electrode and mirror. It is possible to increase the drive voltage to compensate for the decrease in the drive force associated with the increase in the distance; conventionally, however, the drive voltage is about 5 to 10 volts in the drive circuit by means of a CMOS process used for driving a mirror and, therefore, a relatively special process such as a DMOS process is required if a drive voltage in excess of about 10 volts is needed. A DMOS process would greatly increase the cost of a mirror device and hence, is undesirable.

Further, for the purpose of cost reduction, it is desirable to obtain as many mirror devices as possible from a single semiconductor wafer substrate in order to increase productivity. Shrinking the pitch between mirror elements reduces the size of the mirror device per se. The area size of an electrode is also reduced in association with a reduction in the size of the mirror, which also leads to less driving power.

Along with these requirements for miniaturizing a mirror device, there is a design tradeoff for further consideration because of the fact that the larger a mirror device, the brighter is the display image when the conventional light lamp is used as the light source. Attributable to an optical functional relationship generally known as etendue, the efficiency of the non-polarized light projected from the conventional lamp may be substantially reduced. The adverse effects must be taken into consideration as an important factor for designing and configuring an image projection system, particularly for designing the light sources.

Figure 2A:
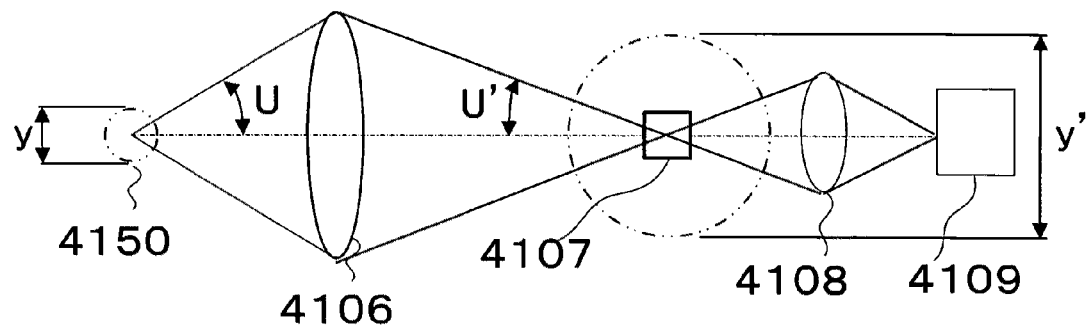
FIG. 2A shows a side view of an optical system for illustrating the etendue by exemplifying the case of using a discharge lamp light source and projecting an image by way of an optical device.

Referring to FIG. 2A, a light source 4150 projects an illumination light through a light source lens to impinge onto a device 4107. The light is then transmitted from the device 4107 through a projection length 4108 to project an image 4109.

Let "y" be defined as the size of a light source 4150 and "u" as the angle of light with which an optical lens project a the light from the light source. Further, let "u'" be the converging angle on the image side converged by using the optical lens 4106, and "y'" be the size of an image projected onto a screen 4109 by way of an optical device 4107 and a projection lens 4108. Here, there is a relationship called etendue among the following factors: the size y of the light source 4150, the import angle u of light, the converging angle u' on the image side, and the size y' of an image. In this optical system, the optical transmissions may be represented by the following equation:

$$y*u = y'*u'$$

Figure 2B:
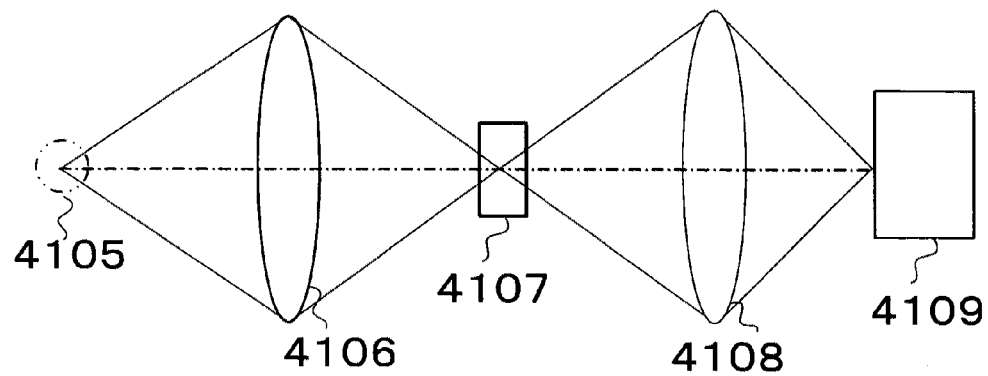
FIG. 2B shows a side view of an optical system for illustrating the optical transmissions of using a discharge lamp light source in projecting an image by way of an optical device.

Based on the relationship, the smaller the optical device 4107 for receiving the illumination light from the light source 4150, the smaller is the import angle u of light. For this reason, when the optical device 4107 is made smaller, the brightness of the image is reduced as a result of limiting the import angle u of light. Therefore, when using an arc discharge lamp with low light beam coherency, in order to maintain certain brightness of the projected image, the projection angle u of light must be maintained in an appropriate rang. FIG. 2B is an illustrative diagram of the use of an arc discharge lamp light source in projecting an image by way of an optical device.

The light output from an arc discharge lamp light source 4105 is converged by using an optical lens 4106, and irradiated onto the optical device 4107. Then, the light passing through the optical device 4107 is projected onto a screen 4109 by way of a projection lens 4108.

The larger the optical lens used in this case, the greater the converging capacity and the better the usage efficiency of light. However, increasing the optical device 4107 is contradictory to the demand for miniaturizing the spatial light modulator and making the projection apparatus more compact.

In contrast, a laser light source has a higher directivity of light and a smaller expansion of light flux than those of an arc discharge lamp light source. Therefore, a projected image can be made sufficiently bright without the need to increase the size of an optical lens or optical device. Further, the brightness of a projected image can be increased by increasing the output of the laser light source. Also in this case, the light intensity can be increased without a substantial expansion of light flux because of the high directivity of the laser light.

Figure 2C:
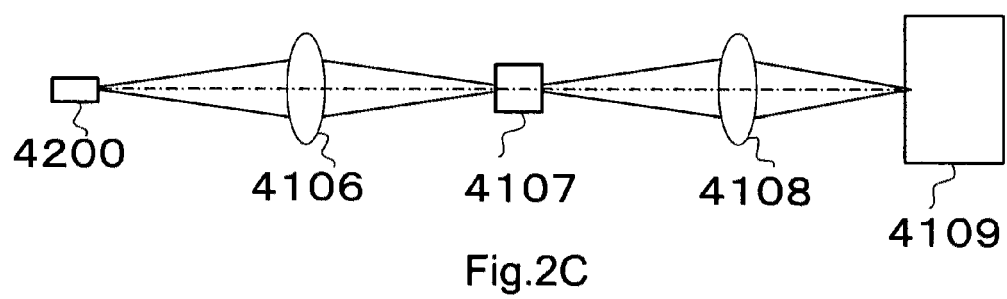
FIG. 2C shows a side view of an optical system for illustrating the optical transmissions of using a laser light source in projecting an image by way of an optical device.

FIG. 2C is an illustrative diagram of the use of a laser light source in projecting an image by way of an optical device.

The laser light emitted from a laser light source 4200 is made to be incident to an optical device 4107 by way of an optical lens 4106. Then, the light passing through the optical device 4107 is projected onto a screen 4109 by way of a projection lens 4109.

In this case, the usage efficiency of light for the optical lens 4106 and optical device 4107 is improved by taking advantage of the high directivity of the laser light. Therefore, a projected image can be made brighter without the need to increase the size of the optical lens 4106 or optical device 4107. This configuration eliminates the problem of etendue, making it possible to miniaturize the optical lens 4106 and optical device 4107, leading to a more compact projection apparatus.

The following descriptions explain how to determine the limit value of the aperture ratio of a projection lens. A projection apparatus implements the projection lens to enlarge and display the modulated pixels reflected form the surface of a mirror device according to the resolution requirement of the projection apparatus.

The pixel pitch of the mirror device is designated with a symbol "Rp" to represent the distance between adjacent mirror elements of the mirror device. The aperture ration of a projection lens is designated with a symbol "NA", the F-number is designated with a symbol "F" and the wavelength of the light is designated by a symbol "$\lambda$". The limit value of the pixel pitch "Rp" between adjacent pixels on the projection surface is derived by the following equation:

$$Rp = 0.61 * \lambda NA = 1.22 * \lambda * F$$

The table below shows the F value of a projection lens and deflection angle of a mirror when the pitch of adjacent mirror elements is shortened by miniaturizing the mirror elements, with the wavelength of light beam designated at $\lambda=650$ nm, which is the lowest value within the range of visible light. Meanwhile, the F value of a projection lens with the wavelength designated at 700 nm is about 7% smaller than the F value for the wavelength of 650 nm.

| Pixel pitch of mirror device [μm] | F number of projection lens | Deflection angle of mirror [degrees] |
| --- | --- | --- |
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, if the problem related to the above described etendue is avoided by using a laser light for the light source, the F numbers of lenses for the illumination system and projection system can be increased to the values shown in the table, making it possible to decrease the deflection angle of the mirror element, and thereby, configuring a smaller mirror device with a low drive voltage.

Another method of driving a mirror to display an image with higher levels of gray scale resolution with a reduced drive voltage is disclosed in US Patent Application 20050190429. In this patent application, a mirror is controlled to operate in a free oscillation state in the inherent oscillation frequency, and thereby an intensity of light about 25% to 37% of the emission light intensity produced when a mirror is controlled under a constant ON can be obtained during the oscillation period of the mirror.

According to such a control, it is no longer required to drive the mirror at a high speed to achieve a higher resolution of gray scale. A high level of gray scale resolution is achievable with a hinge of a low spring constant for supporting the mirror. The drive voltage may be reduced. This method, combined with the method of decreasing the drive voltage by decreasing the deflection angle of a mirror, as described above, would produce even greater improvements.

As described above, the use of a laser light source makes it possible to decrease the deflection angle of a mirror and also shrink the mirror device without ushering in a degradation of brightness, and further, the use of the above described oscillation control enables a higher level of gradation without causing an increase in the drive voltage.

The following description is for a spatial light modulator according to the present embodiment implemented as a mirror device.

Figure 3:
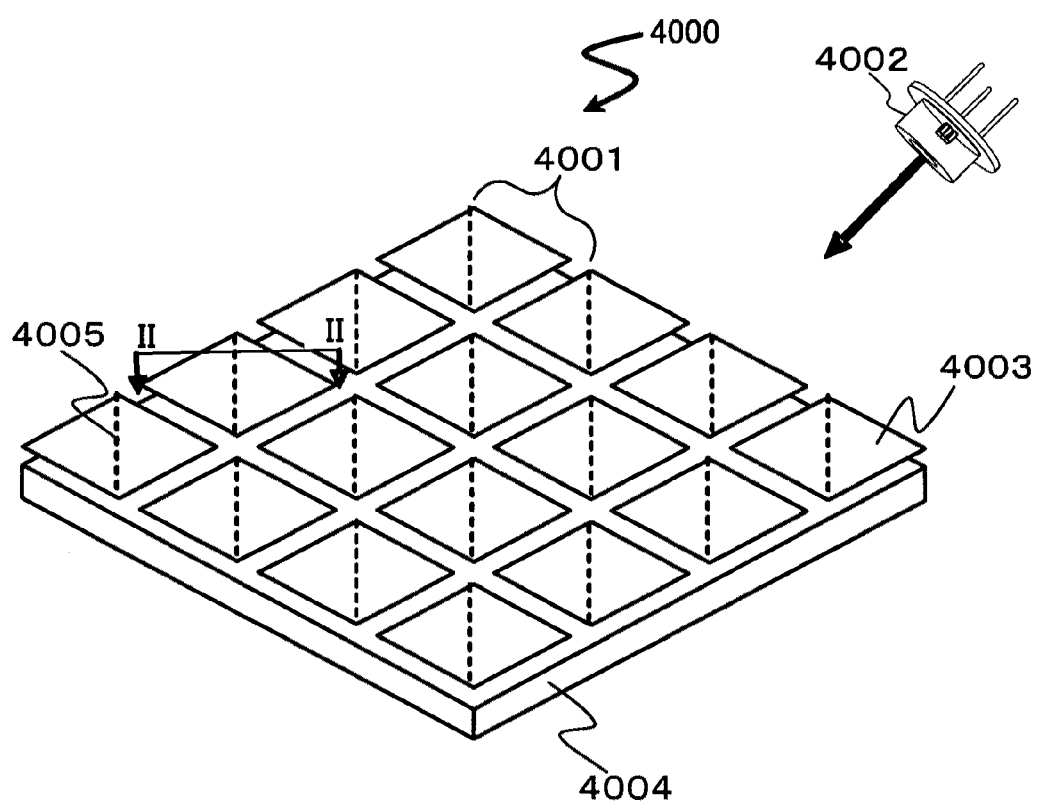
FIG. 3 is a perspective top view for showing a spatial light modulator, in which a plurality of mirror element for controlling the reflecting direction of incident light by deflecting a mirror is arrayed on a device substrate in two dimensions.

FIG. 3 diagram of a diagonal view of a mirror device that includes micromirrors 4003 configures as two dimension arrays. Each of the plurality of mirror elements is controlled to oscillate and deflect to specific angles for reflecting the incident light according to the mirror control signals.

Figure 6:
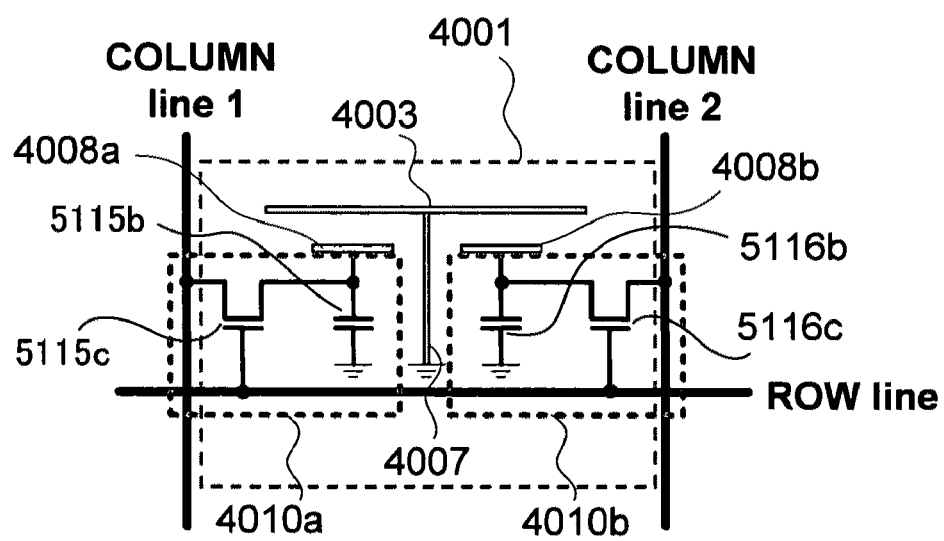
FIG. 6 is an outline diagram of the cross-section of one mirror element of the spatial light modulator along the line II-II shown in FIG. 3.

As shown in FIG. 3, the spatial light modulator 4000 includes mirror elements 4001 arranged as two-dimensional arrays on a device substrate 4004. Each of these mirror elements includes address electrodes (not shown here), elastic hinge (not shown here), and a mirror 4003 supported by the elastic hinge. In FIG. 6, each of these multiple mirror elements 4001 comprises a square mirror 4003. The square mirrors 4003 are arrayed alone two horizontal directions in regular intervals on the device substrate 4004.

The pitch (i.e., the interval) between adjacent mirrors 4003 is preferably between, 4 μm and 10 μm, in consideration of the number of pixels required for various levels from a 2K×4K super hi-vision TV, or the like, to a non-full hi-vision device. Here, the "pitch" is the distance between the respective deflection axes of adjacent mirrors 4003. It is even more desirable, if possible that the pitch between the respective deflection axes of adjacent mirrors 4003 is between 4 μm and 7 μm.

One side of the mirror 4003 may be formed to measure between 4 μm and 10 μm. The gap between adjacent mirrors should be maintained anywhere between 0.15 μm and 0.55 μm, in order to prevent the reflection lights of the adjacent mirrors from interfering with each other. If the gap between mirrors is configured in this way, the aperture ratio of the reflection surface of mirror will be improved by 90% or higher. Furthermore, the optical energy irradiated onto the device substrate 4004 through the gaps between the mirrors is reduced. Note that the mirror 4003 has an aperture ratio of 80% or higher and has a reflectance of 80% or higher.

The diagonally measured size of a mirror array for use in a full high definition (Full HD) television can be miniaturized to a size in the range of 10.16 mm to 22.098 mm (0.4 inches to 0.87 inches) by arraying a plurality of mirror elements 4001 described above on the devise substrate 4004.

When about 1 mm, respectively, for a land electrode and the like, which are used for the circuit wiring driving each mirror element, are secured in the mirror array in which the mirror size is miniaturized as described above, the size of the device substrate 4004 is approximately as follows.

For a 6 μm pixel pitch and 4:3 XGA screen, the mirror array is about 7.62 mm (0.30 inches), and the device substrate 4004 is about 10.16 mm (0.4 inches).

For a 7 μm pixel pitch and 4:3 XGA screen, the mirror array is about 8.89 mm (0.35 inches), and the device substrate 4004 is about 11.43 mm (0.45 inches).

For a 7 μm pixel pitch and 16:9 Full HD screen, the mirror array is about 15.24 mm (0.6 inches), and the device substrate 4004 is about 17.78 mm (0.70 inches).

For a 9 μm pixel pitch and 16:9 Full HD screen, the mirror array is about 19.81 mm (0.78 inches), and the device substrate 4004 is about 22.098 mm (0.87 inches).

Further, the drawing indicates the dotted line as the deflection axis 4005. A mirror 4003 is deflected relative to the dotted line. The light emitted from a light source 4002 has a coherent characteristic to project to the mirror 4003 along the orthogonal or diagonal direction relative to the deflection axis 4005. The light source 4002 may be a coherent light such as a light projected from a laser light source.

Figure 4A:
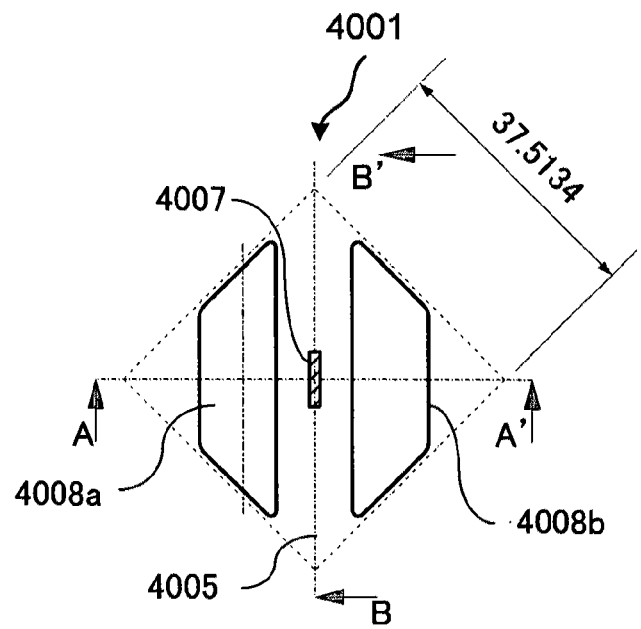
FIG. 4A is a top view diagram of the mirror element of a spatial light modulator according to a preferred embodiment of the present invention.
Figure 4B:
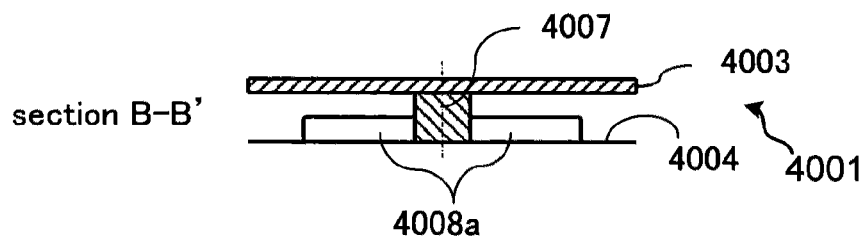
FIG. 4B is an outline diagram showing the cross-sectional structure (along line B'-B of FIG. 4A) of the mirror element of a spatial light modulator according to the embodiment of the present invention.
Figure 4C:
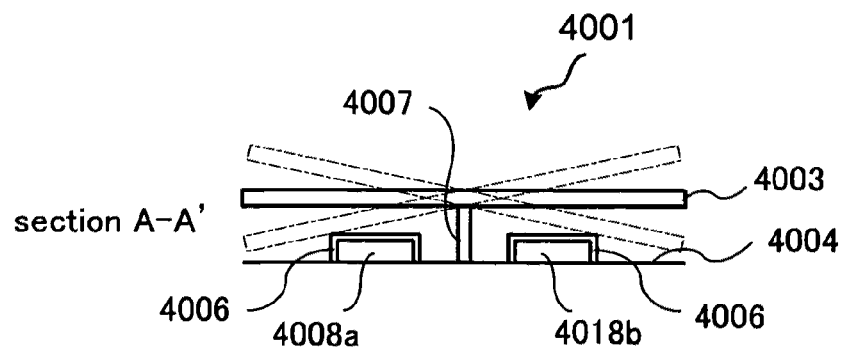
FIG. 4C is an outline diagram showing the cross-sectional structure (along line A-A' of FIG. 4A) of the mirror element of a spatial light modulator according to the embodiment of the present invention.

FIGS. 4A, 4B and 4C are respectively a top view and a side cross sectional view a mirror element of a spatial light modulator 4000 according to the present embodiment. FIG. 4A shows a mirror element, as viewed from above, with the mirror removed. FIG. 4B is a diagram of a cross-section of the mirror element of FIG. 9A taken along the line B-B' depicted in FIG. 4A. FIG. 4C is a diagram of a cross-section of the mirror element of FIG. 9A taken along the line A-A' depicted in FIG. 4A.

In the mirror element shown in FIGS. 4A through 4C, the mirror 4003 is made of a highly reflective material such as aluminum, gold or dielectric multi-layer. The mirror is supported by the elastic hinge 4007, of which the entirety or a part (e.g., the connection part with a fixing part, the connection part with a moving part, or the intermediate part) is made of a silicon material, a metallic material or combination of or similar kinds of materials, and the mirror 4003 is placed on the device substrate 4004. Here, the silicon material may be composed of a poly-silicon, single crystal silicon, amorphous silicon, and the like, while the metallic material may include aluminum, titanium, an alloy of them, or a composite material. The devise substrate 4004 is made of the silicon material or similar kinds of materials.

The mirror 4003 is formed in the approximate shape of a square, with the length of a side, ranging between 4 μm and 10 μm in an exemplary embodiment. Furthermore, the mirror pitch may be between 4 μm and 10 μm. The deflection axis 4005 of the mirror 4003 is on the diagonal line thereof.

The lower end of the elastic hinge 4007 is connected to the device substrate 4004 that includes a circuit for driving the mirror 4003. The upper end of the elastic hinge 4007 is connected to the bottom surface of the mirror 4003. An electrode, for securing an electrical continuity, and an intermediate member, for improving the strength of a member and improving the strength of connection, may be placed between the elastic hinge 4007 and the device substrate 4004 or between the elastic hinge 4007 and mirror 4003.

As exemplified in FIG. 4C, the address electrodes (4008a and 4008b) used for driving the mirror 4003 are placed on the top surface of the device substrate 4004 and opposite to the bottom surface of the mirror 4003. The form of the address electrodes may be symmetrical or asymmetrical about the deflection axis 4005. The address electrodes are made of aluminum (Al), copper (Cu), tungsten (W), or other similar material.

Figure 5:
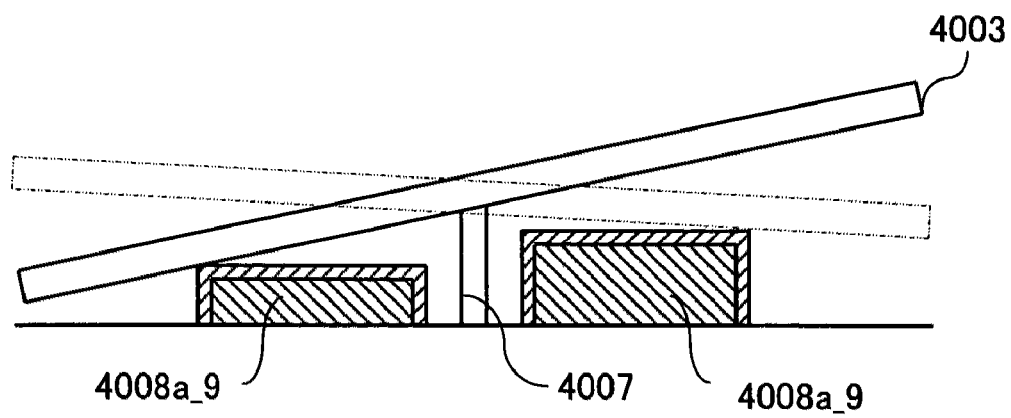
FIG. 5 is a diagram showing a cross section of an exemplary modification of form of an electrode included in the mirror element of a spatial light modulator according to the embodiment of the present invention.

It is possible to form an address electrode so that the deflection angles of the mirror 4003, when it contacts the address electrode on one side and when it contacts the address electrode on the other side, are the same as shown in FIG. 4C. Alternately, it is possible to form an address electrode so that the deflection angles of the mirror 4003, on the two sides of the deflection axis are different from each other, as shown in FIG. 5.

Furthermore, the deflection axis of the mirror need not be at the center of the mirror, as FIGS. 3 and 4A suggest. The mirror element may be configured to have a deflection axis at one end of the mirror, with the mirror deflecting asymmetrically about the deflection axis.

Next is a description, in detail, of an example of the configuration of the spatial light modulator 4000 according to the present embodiment.

As described above, the spatial light modulator 4000 according to the present embodiment is a deflectable mirror device that arranges, in array, a plurality of mirror elements.

FIG. 6 is an outline diagram of a cross-section, viewed as indicated by the line II-II in FIG. 3, of one mirror element 4001 of the spatial light modulator 4000.

The mirror element 4001 is comprised of a mirror 4003, an elastic hinge 4007 for retaining the mirror 4003, address electrodes 4008a and 4008b, and two memory cells (a first memory cell 4010a and a second memory cell 4010b), which apply a voltage to the address electrodes 4008a and 4008b in order to control the mirror 4003 under a desired deflection state.

The first and second memory cells 4010a and 4010b each have a dynamic random access memory (DRAM) structure comprising gate transistors (gate transistor 5116c, gate transistor 5115c) and capacitors (ON capacitor 5116b, OFF capacitor 5115b) in this configuration. The structures of the individual memory cells 4010a and 4010b are not limited as such and may instead be, for example, a static random access memory (SRAM) structure or the like.

Further, the individual memory cells 4010a and 4010b are connected to the respective address electrodes 4008a and 4008b via a COLUMN line 1, a COLUMN line 2 and a ROW line.

In the first memory cell 4010a, a gate transistor 5115c is connected to the address electrode 4008a, COLUMN line 1, and ROW line; an OFF capacitor 5115b is connected between the address electrode 4008a and GND (i.e., the ground). Likewise in the second memory-cell 4010b, a gate transistor 5116c is connected to the address electrode 4008b, COLUMN line 2, and ROW line, respectively; an ON capacitor 5116b is connected between the address electrode 4008b and GND.

Controlling the signals on the COLUMN line 1 and ROW line applies a predetermined voltage to the address electrode 4008a, thereby making it possible to tilt the mirror 4003 towards the address electrode 4008a. Likewise, controlling the signals on the COLUMN line 2 and ROW line applies a predetermined voltage to the address electrode 4008b, thereby making it possible to also tilt the mirror 4003 towards the address electrode 4008b.

The opening and closing of the gate transistor 5116c and gate transistor 5115c are controlled by the ROW line.

That is, mirror elements 4001 in a horizontal row in line with an arbitrary ROW line are simultaneously selected, and the charging and discharging, the charge in the ON capacitor 5116*b* and OFF capacitor 5115*b*, are controlled by COLUMN line 1 and COLUMN line 2, respectively. In this way, the ON and OFF states of the mirrors 4003 of individual mirror elements 4001 in one horizontal row are simultaneously controlled.

Note that a drive circuit for each of the memory cells 4010*a* and 4010*b* is embedded in the device substrate 4004. Controlling the memory cells 4010*a* and 4010*b*, in accordance with the signal of image data, enables control of the deflection angle of the mirror 4003 and the modulation and reflection of the incident light.

FIG. 7 shows an exemplary embodiment of the layout of the internal configuration of the spatial light modulator 4000 according to the present embodiment.

FIG. 7 shows an exemplary embodiment of the spatial light modulator 4000 that includes a mirror element array 5110, column drivers 5120, ROW line decoders 5130, and an external interface unit 5140.

The external interface unit 5140 comprises a timing controller 5141 and a selector 5142. The timing controller 5141 controls the ROW line decoder 5130 on the basis of a timing signal from the SLM controller 5530 (not shown in the drawing). The selector 5142 supplies the column driver 5120 with digital signal incoming from the SLM controller 5530 (not shown in the drawing).

Figure 8:
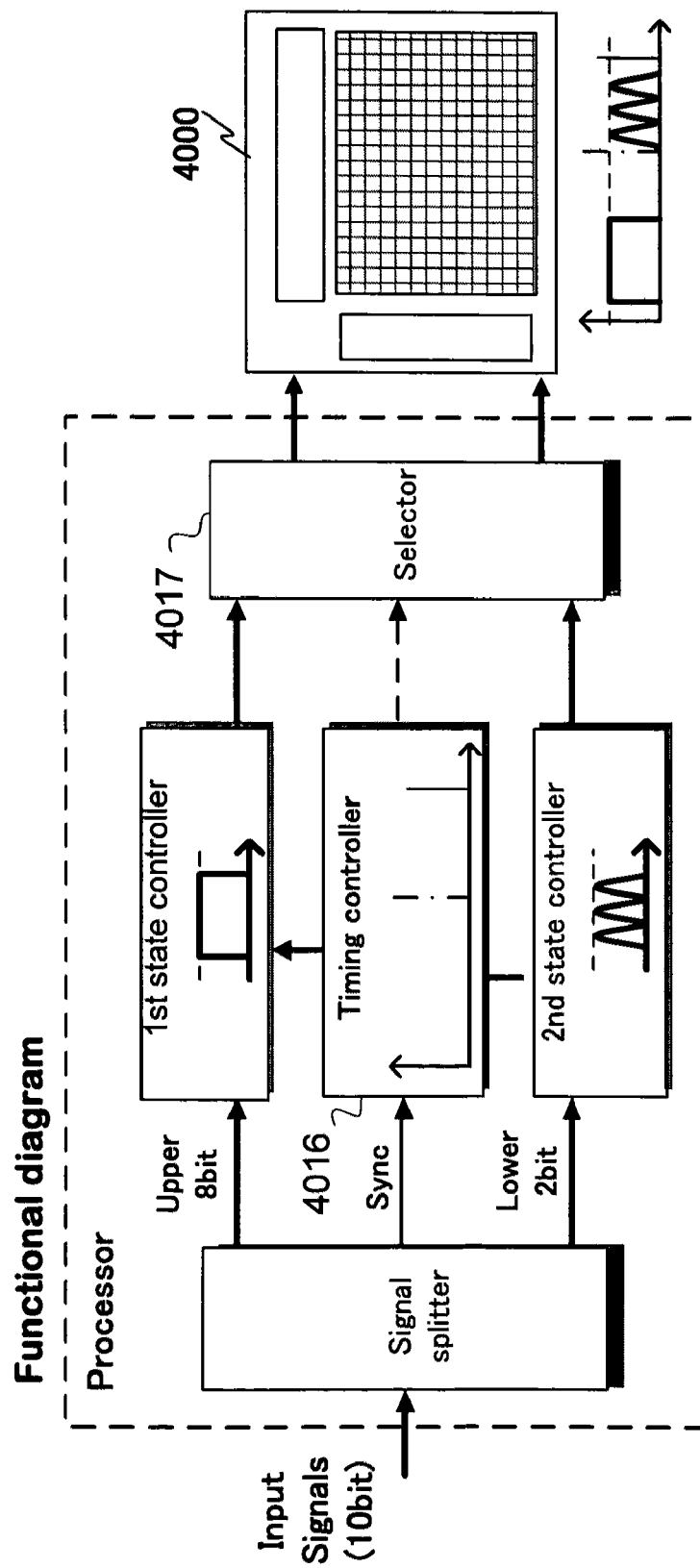
FIG. 8 is a functional block diagram of signal processing performed by an SLM controller controlling a spatial light modulator according to the embodiment of the present invention.

A plurality of mirror elements 4001 are arrayed as a mirror element array 5110 at the positions aligned with individual bit lines. The bit lines are vertically extended from the column drivers 5120, crosses individual word lines. The word lines are horizontally extended from the row decoders 5130. FIG. 8 conceptually shows signal processing performed by the SLM controller shown in FIGS. 9A and 9B. In this example, the first state is defined as the ON/OFF state of the mirror of the spatial light modulator 4000, and the second state is defined as the oscillation state. FIG. 8 illustrates an example of a system diagram of this invention. In this example, a 10-bit signal input is split into two parts, for example, the upper 8 bits and the lower 2 bits. The upper 8 bits are sent to the 1$^{st}$ state controller, the lower 2 bits are sent to the 2$^{nd}$ state controller, and the sync signal is sent to the timing controller 4016.

The configuration, as described above, makes it possible to switch between the control of mirror using the first state and the control of mirror using the second state.

Note that the sync signal is generated by the signal splitter on the basis of an input video signal. The timing controller 4016 controls the selector 4017 in accordance with the sync signal and switches between having the 1$^{st}$ state controller control the spatial light modulator 4000 or having the 2$^{nd}$ state controller control it. Note that the signal splitter, 1$^{st}$ state controller, 2$^{nd}$ state controller, timing controller 4016, and selector 4017 are used for conceptually expressing the processing of a video signal, and therefore a configuration may be such that, for example, a single processing apparatus executes these functions simultaneously.

Figure 9A:
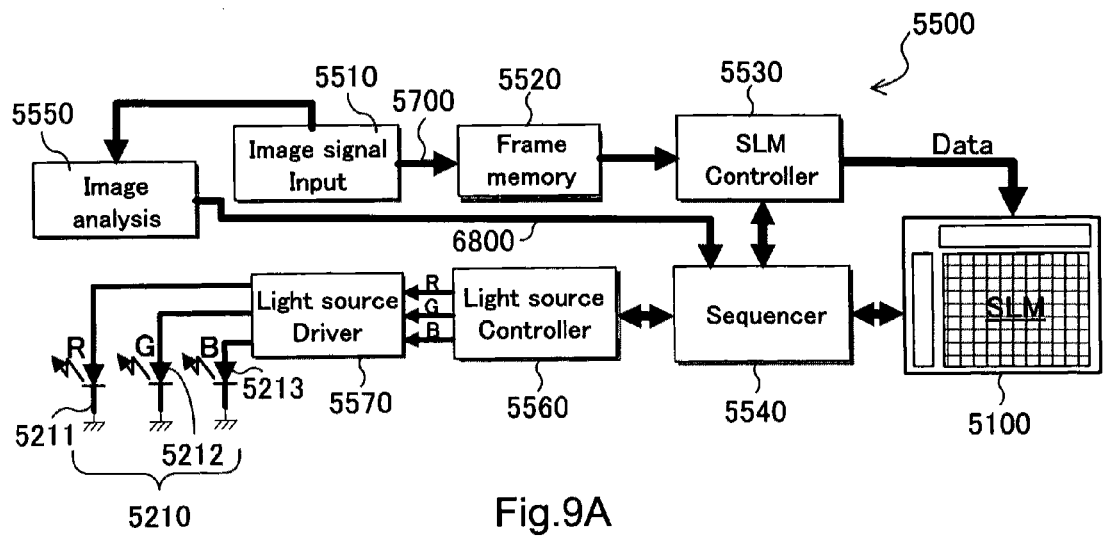
FIG. 9A is a functional block diagram exemplifying the configuration of a control unit comprised in a single-panel projection apparatus according to a preferred embodiment of the present invention.

FIG. 9A is a functional block diagram exemplifying the configuration of a control unit 5500 comprised in a single-panel projection apparatus 5010 (exemplified in FIG. 12A and described later). The control unit 5500 comprises a frame memory 5520, an SLM controller 5530, a sequencer 5540, a light source control unit 5560, and a light source drive circuit 5570. The sequencer 5540, constituted by a microprocessor and the like, controls the operation timing of the entirety of the control unit 5500 and spatial light modulators 5100. The frame memory 5520 retains the amount of one frame of input digital video data 5700 incoming from an external device (not shown in the drawing), which is connected to a video signal input unit 5510. The input digital video data 5700 is updated, moment-by-moment, every time the display of one frame is completed.

The SLM controller 5530 processes the input digital video data 5700 read from the frame memory 5520, separates the read data into multiple sub-fields 5701 through 5703, and outputs them to the spatial light modulators 5100 as control data, which are used for implementing the ON/OFF control and oscillation control (which are described later) of a mirror 5112 of the spatial light modulator 5100. The sequencer 5540 outputs a timing signal to the spatial light modulators 5100 in sync with the generation of the control data at the SLM controller 5530. The video image analysis unit 5550 outputs a video image analysis signal 5800 used for generating various light source patterns on the basis of the input digital video data 5700 inputted from the video signal input unit 5510.

The light source control unit 5560 controls, by way of the light source drive circuit 5570, the operation of the variable light source 5210 emitting the illumination light 5600 by using a light source profile control signal. The light source profile control signal is generated by inputting the video image analysis signal 5800 obtained from the video image analysis unit 5550, by way of the sequencer 5540 wherein the sequencer generates light source pulse patterns.

The light source drive circuit 5570 drives the red laser light source 5211, green laser light source 5212, and blue laser light source 5213 of the variable light source 5210 to emit light, respectively, so as to generate the light source pulse patterns, which are inputted from the light source control unit 5560.

Figure 9B:
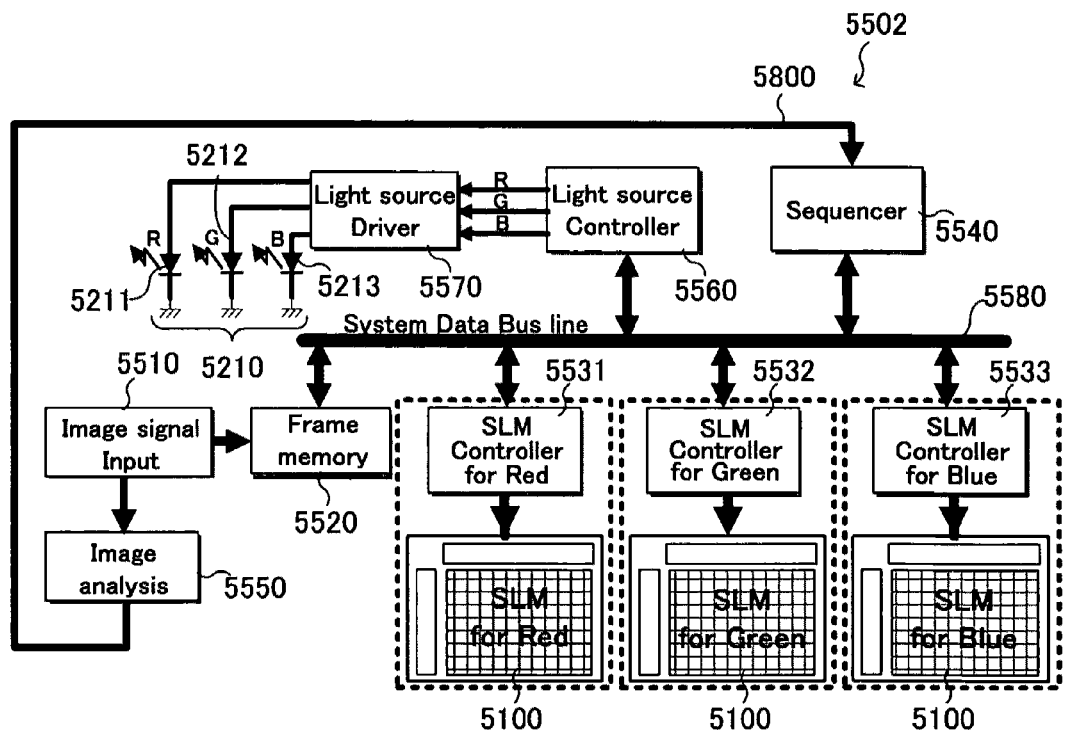
FIG. 9B is a functional block diagram exemplifying the configuration of a control unit comprised in a multi-panel projection apparatus according to a preferred embodiment of the present invention.

FIG. 9B is a functional block diagram exemplifying the configuration of a control unit comprised in a multi-panel projection apparatus according to the present embodiment (exemplified in FIG. 12B described later). The control unit 5502 includes a plurality of SLM controllers 5531, 5532 and 5533, which control each of the multiple spatial light modulators 5100 equipped for the respective colors R, G and B. The configuration of the controllers is the main difference from the above described control unit 5500, otherwise they are similar.

Further, a system bus 5580 is equipped to connect the frame memory 5520, light source control unit 5560, sequencer 5540 and SLM controllers 5531 through 5533, in order to speed up and simplify the connection path of each connecting element.

Figure 10A:
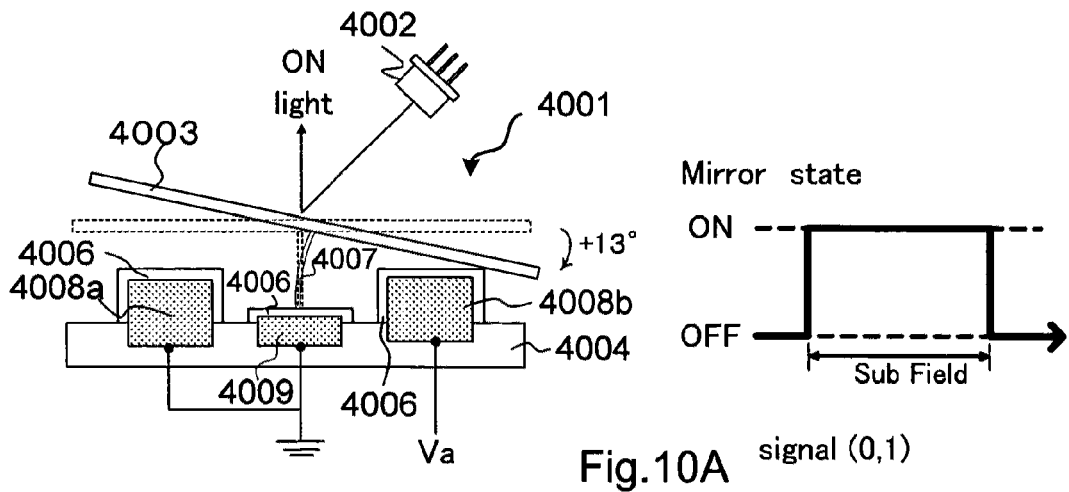
FIG. 10A is a cross-sectional diagram depicting the state in which an incident light is reflected towards a projection optical system by deflecting the mirror of a mirror element according to a preferred embodiment of the present invention.
Figure 10B:
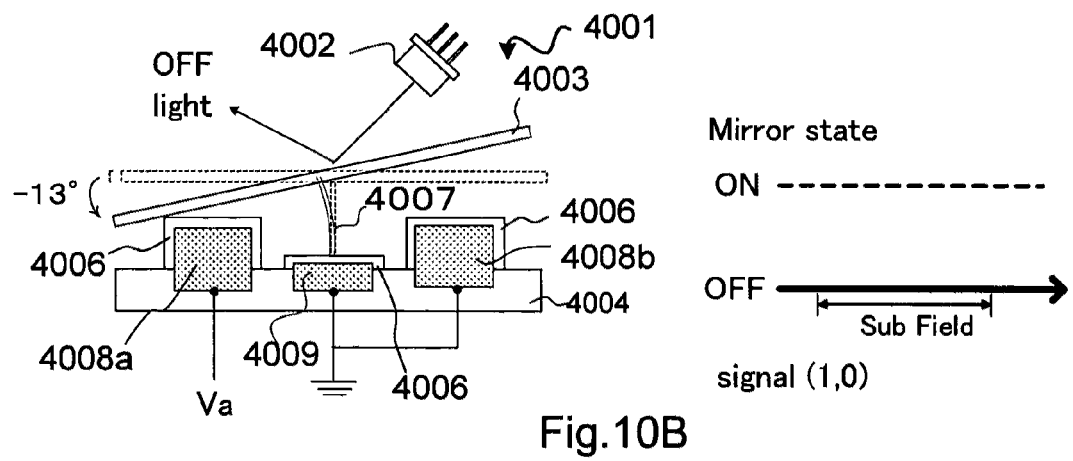
FIG. 10B is a cross-sectional diagram depicting the state in which an incident light is reflected away from a projection optical system by deflecting the mirror of a mirror element according to the embodiment of the present invention.
Figure 10C:
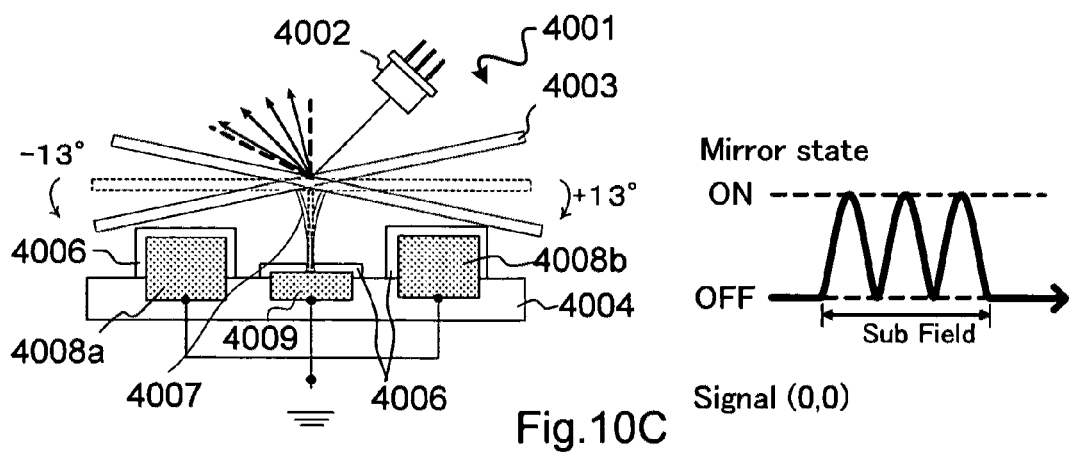
FIG. 10C is a cross-sectional diagram depicting the state in which incident light is reflected towards and away from a projection optical system by the repeated free-oscillation of the mirror of a mirror element according to the embodiment of the present invention.

The following description is for the operation of deflecting the mirror 4003 of the mirror element 4001, shown in FIG. 3, with reference to FIGS. 10A, 10B and 10C.

FIG. 10A is a diagram depicting a state in which incident light is reflected towards a projection optical system by deflecting the mirror of a mirror element. FIG. 10A shows the memory cells 4010*a* and 4010*b* (which are not shown here) for storing signal (0,1) for applying a voltage of "0" volts to the address electrode 4008*a* of FIG. 10A and applies a voltage of Va volts to the address electrode 4008*b*. As a result of applying the voltage of Va volts, the mirror 4003 is drawn by a coulomb force and deflected from a deflection angle of "0" degrees, i.e., the horizontal state, to that of +13 degrees in the direction of the address electrode 4008*b*. This causes the incident light to be reflected by the mirror 4003 towards the projection optical system known as the ON state).

Specifically, the present patent application defines the deflection angles of the mirror 4003 as "+" (positive) for clockwise (CW) direction and "−" (negative) for counter-clockwise (CCW) direction, with "0" degrees as the initial state of the mirror 4003. Further, an insulation layer 4006 is provided on the device substrate 4004 and a hinge electrode 4009, connected to the elastic hinge 4007, is grounded through the insulation layer 4006.

FIG. 10B is a diagram depicting a state in when incident light is reflected away from a projection optical system by deflecting the mirror of a mirror element.

With a signal (1, 0) stored in the memory cells 4010*a* and 4010*b* (which are not shown here), illustrated in detail in FIG. 6, a voltage of Va volts is applied to the address electrode 4008*a*, and "0" volts is applied to the address electrode 4008*b*. As a result of applying the voltage Va volts to the electrode 4008*a*, the mirror 4003 is drawn by a coulomb force and deflected from a deflection angle of "0" degrees, i.e., the horizontal state, to that of −13 degrees in the direction of the address electrode 4008*a*. This causes the incident light to be reflected by the mirror 4003 in a direction away from that of the light path towards the projection optical system (known as the OFF state).

FIG. 10C is a diagram delineating a state in which incident light is reflected towards and away from a projection optical system by the repeated by free-oscillation of the mirror of a mirror element.

In FIG. 10C a signal (0, 0) is stored in the memory cells 4010*a* and 4010*b* (which are not shown here) and a voltage of "0" volts is applied to the address electrodes 4008*a* and 4008*b*. As a result of zero voltage applied to the electrodes, the Coulomb force between the mirror 4003 and the address electrode 4008*a* or 4008*b*, is withdrawn. The mirror 4003 is operated in a free oscillation state within the range of the deflection angles, ±13 degrees, in accordance with the property of the elastic hinge 4007. During the free oscillation of the mirror 4003, incident light is reflected towards the projection optical system only when it is within the range of a deflection angle to produce the ON light. The mirror 4003 repeats the free oscillations, changing over frequently between the ON light state and OFF light state. Controlling the number of changeovers makes it possible to finely adjust the intensity of light reflected towards the projection optical system (which is called a free oscillation state).

The total intensity of light reflected by means of the free oscillation towards the projection optical system is certainly lower than the intensity that is produced when the mirror 4003 is continuously in the ON light state and higher than the intensity that is produced when it is continuously in the OFF light state. That is, it is possible to make an intermediate intensity between those of the ON light state and OFF light state. Therefore, by finely adjusting the intensity as described above, a higher gradation image can be projected than with the conventional technique.

Although not shown in the drawing, an alternative configuration may be such that, in the initial state of a mirror 4003, only a portion of incident light is reflected to enter the projection optical system. Configuring as such makes a reflection light enter the projection optical system at a higher intensity than that produced when the mirror 4003 is continuously in the OFF light state and with a lower intensity than that produced when the mirror 4003 is continuously in the ON light state thus controlling the mirror to operate in an intermediate state.

Note that the mirror device with the oscillation state and intermediate light state is preferable to the conventional mirror device capable of only two states, i.e., the ON light state and OFF light state.

Figure 11A:
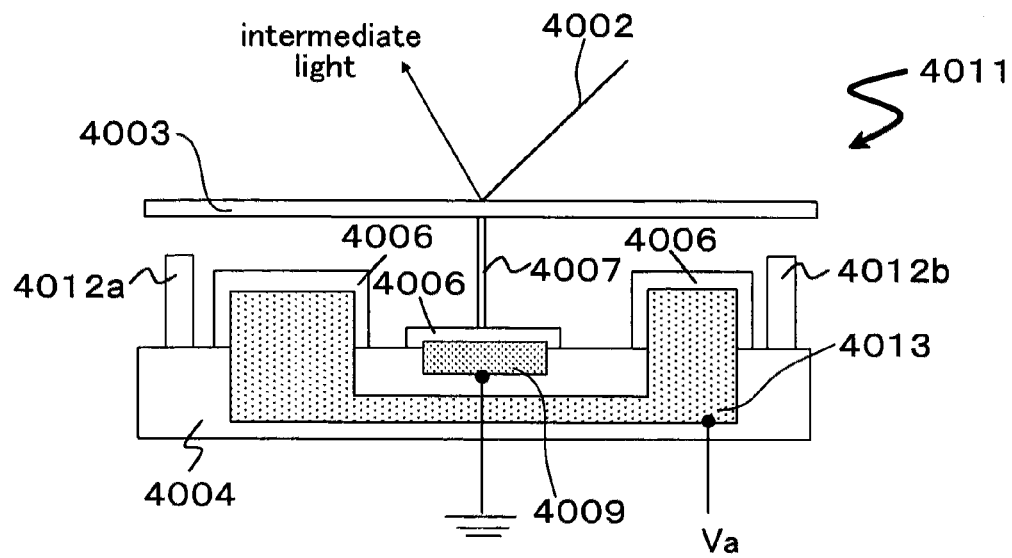
FIG. 11A is a conceptual diagram showing a cross section of a mirror element that is configured to be equipped with only one address electrode and one drive circuit as an exemplary modification of a mirror element according to the embodiment of the present invention.
Figure 11B:
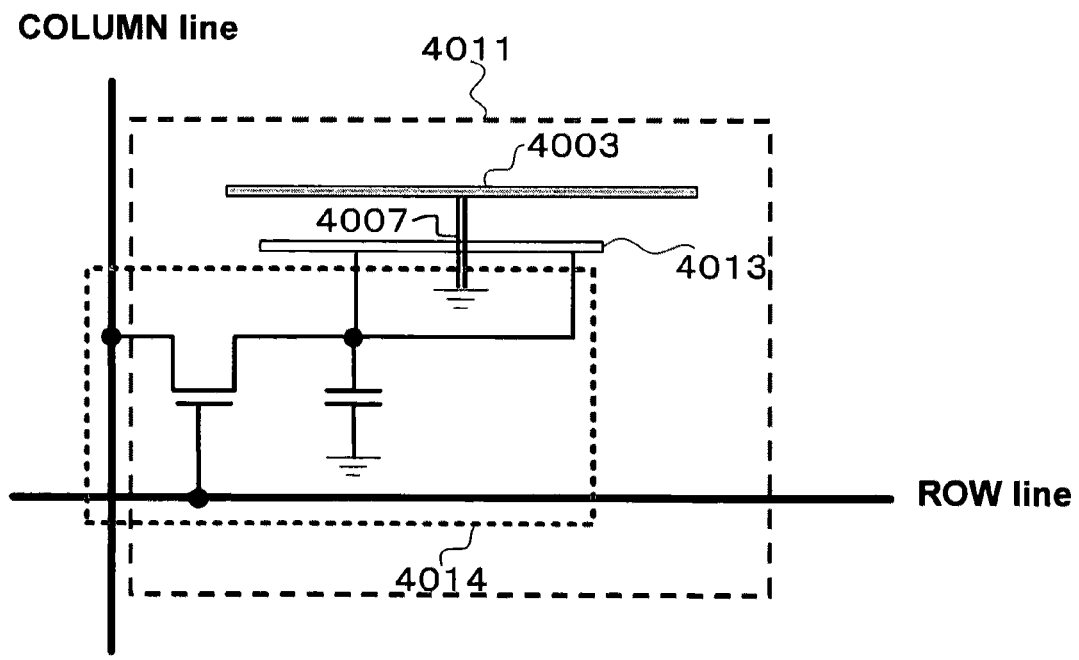
FIG. 11B is an outline diagram of a cross-section of the mirror element shown in FIG. 11A.

FIGS. 11A and 11B are diagrams showing another exemplary modification of a mirror element constituting a spatial light modulator 4000 according to the present embodiment.

FIG. 11A shows a cross-section of a mirror element that is configured to be equipped with only one address electrode and one drive circuit. The mirror element 4011 shown in FIG. 11A is equipped with an insulation layer 4006 on a device substrate 4004, which includes a drive circuit for deflecting the mirror 4003. Further, an elastic hinge 4007 is equipped on the insulation layer 4006. The elastic hinge 4007 supports one mirror 4003. One address electrode 4013, which is connected to the drive circuit, is equipped under the mirror 4003. The area sizes of the address electrode 4013 exposed above the device substrate 4004 are configured to be different between the left side and right side of the elastic hinge 4007, or the deflection axis of mirror 4003, with the area size of the exposed part of the address electrode 4013 on the left side of the elastic hinge 4007 being larger than the area size on the right side.

Here, the mirror 4003 is deflected by the electrical control of the address electrode 4013 and drive circuit. The deflected mirror 4003 is retained at a specific deflection angle by contact with stoppers 4012*a* or 4012*b*, which are placed in the vicinity of the left and right sides of the exposed parts of the address electrode 4013. Further, a hinge electrode 4009 connected to the elastic hinge 4007 is grounded through the insulation layer 4006. Such is the comprisal of the mirror element 4011.

Specifically, the part of the address electrode 4013 of FIG. 11A is shown as exposed above the device substrate 4004, and referred to as the "electrode part". Also, the left part is designated the "first electrode part" and the right part is designated as the "second electrode part, with the elastic hinge 4007 or the deflection axis of mirror 4003 referred to as the border.

By configuring the address electrode 4013 to be asymmetrical, that is, the area of the left side is different from that of the right side in relation to the elastic hinge 4007 or the deflection axis of mirror 4003, a voltage applied to the electrode 4013 will generate a difference in coulomb force between (a) and (b), where (a) is the coulomb force generated between the first electrode part and mirror 4003, and (b) is the coulomb force generated between the second electrode part and mirror 4003. Thus, the mirror 4003 can be deflected by differentiating the Coulomb force between the left and right sides of the deflection axis of the elastic hinge 4007 or mirror 4003.

FIG. 11B is an outline diagram of a cross-section of the mirror element 4011 shown in FIG. 11A. The configuration of using only one address electrode 4013 provides the advantage of reducing the two memory cells 4010*a* and 4010*b*, which correspond to the two address electrodes 4008*a* and 4008*b* in the configuration of FIG. 6, to one memory cell 4014. This in turn makes it possible to reduce the amount of wiring needed to control the deflection of the mirror 4003.

The other components of FIG. 11B are similar to the configuration described for FIG. 6, and therefore the description is not provided here.

Note that the mirror pitch, mirror gap, deflection angle, and drive voltage of the mirror device according to the present embodiment are not limited to the values exemplified in the above description but are, rather, preferably in the following ranges (including the values on both ends of the range): the mirror pitch is between 4 µm and 10 µm; the mirror gap is between 0.15 µm and 0.55 µm; the maximum deflection angle of mirror is between 2 degrees and 14 degrees; and the drive voltage of mirror is between 3 volts and 15 volts.

Figure 12A:
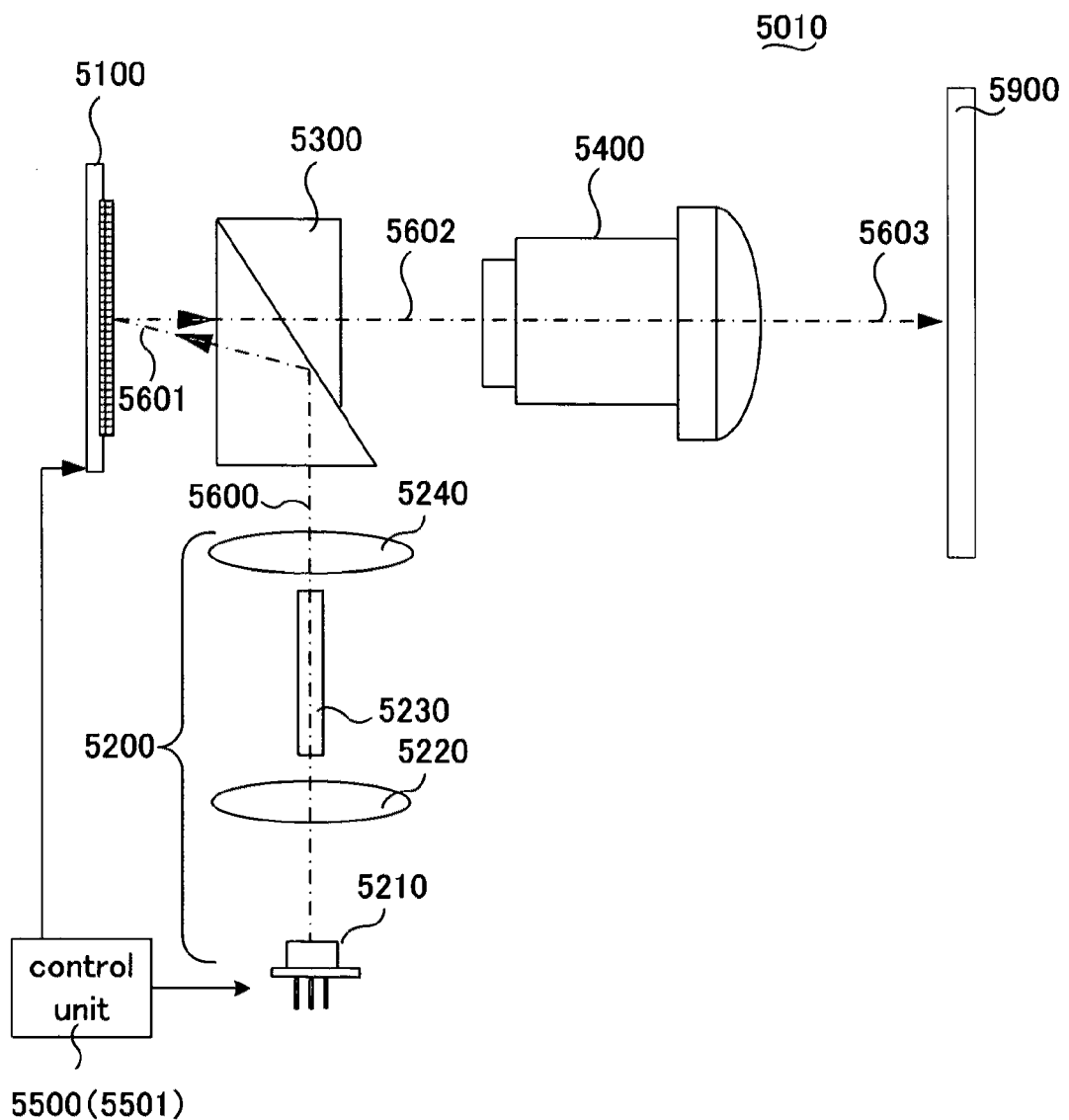
FIG. 12A is a conceptual diagram showing the configuration of a single-panel projection apparatus according to the embodiment of the present invention.

The following description is for a projection apparatus according to an embodiment shown in FIG. 12A. The spatial light modulator 5100 shown in FIG. 12A corresponds to the spatial light modulator 4000 described for the first embodiment. The mirror element 5111 and mirror 5112 included in the spatial light modulator 5100 according to the present embodiment are equivalent to the mirror element 4001 and mirror 4003, respectively, as that included in the spatial light modulator 4000 described for the first embodiment.

FIG. 12A is a functional block diagram for showing the configuration of a single-panel projection apparatus according to a preferred embodiment of the present invention; FIG. 12A shows the projection apparatus 5010 includes a single spatial light modulator (SLM) 5100, a control unit 5500, a Total Internal Reflection (TIR) prism 5300, a projection optical system 5400, and a light source optical system 5200.

The projection apparatus 5010 is generally known as a single-panel projection apparatus 5010 that includes a single spatial light modulator 5100.

The projection optical system 5400 includes the spatial light modulator 5100 and TIR prism 5300 in the optical axis of the projection optical system 5400, with the optical axis of the light source optical system 5200 aligned with the projection optical system 5400.

The TIR prism 5300 directs the illumination light 5600, which is incoming from the light source optical system 5200 placed onto the side, towards the spatial light modulator 5100 at a prescribed inclination angle relative as incident light 5601 and transmits the reflection light 5602, reflected by the spatial light modulator 5100, to the projection optical system 5400.

The projection optical system 5400 projects the reflection light 5602, coming in from the spatial light modulator 5100 and TIR prism 5300, onto a screen 5900, as projection light 5603.

The light source optical system 5200 includes a variable light source 5210 for generating the illumination light 5600, a condenser lens 5220 for focusing the illumination light 5600, a rod type condenser body 5230, and a condenser lens 5240.

The variable light source 5210, condenser lens 5220, rod type condenser body 5230, and condenser lens 5240 are sequentially placed in the aforementioned order along the optical axis of the illumination light 5600, emitted from the variable light source 5210 and for transmitting to the side face of the TIR prism 5300.

The projection apparatus 5010 employs a single spatial light modulator 5100 for implementing a color display on the screen 5900 by means of a sequential color display method. The variable light source 5210 includes a red laser light source 5211, a green laser light source 5212 and a blue laser light source 5213 (not shown in the drawing) that allows independent controls for the light emission states, divides one frame of display data into multiple sub-fields (in this case, three sub-fields: red (R), green (G) and blue (B)) and makes each of the light sources, the red laser light source 5211, green laser light source 5212 and blue laser light source 5213 emit each respective light in a time series at the time band corresponding to the sub-field of each color.

Figure 12B:
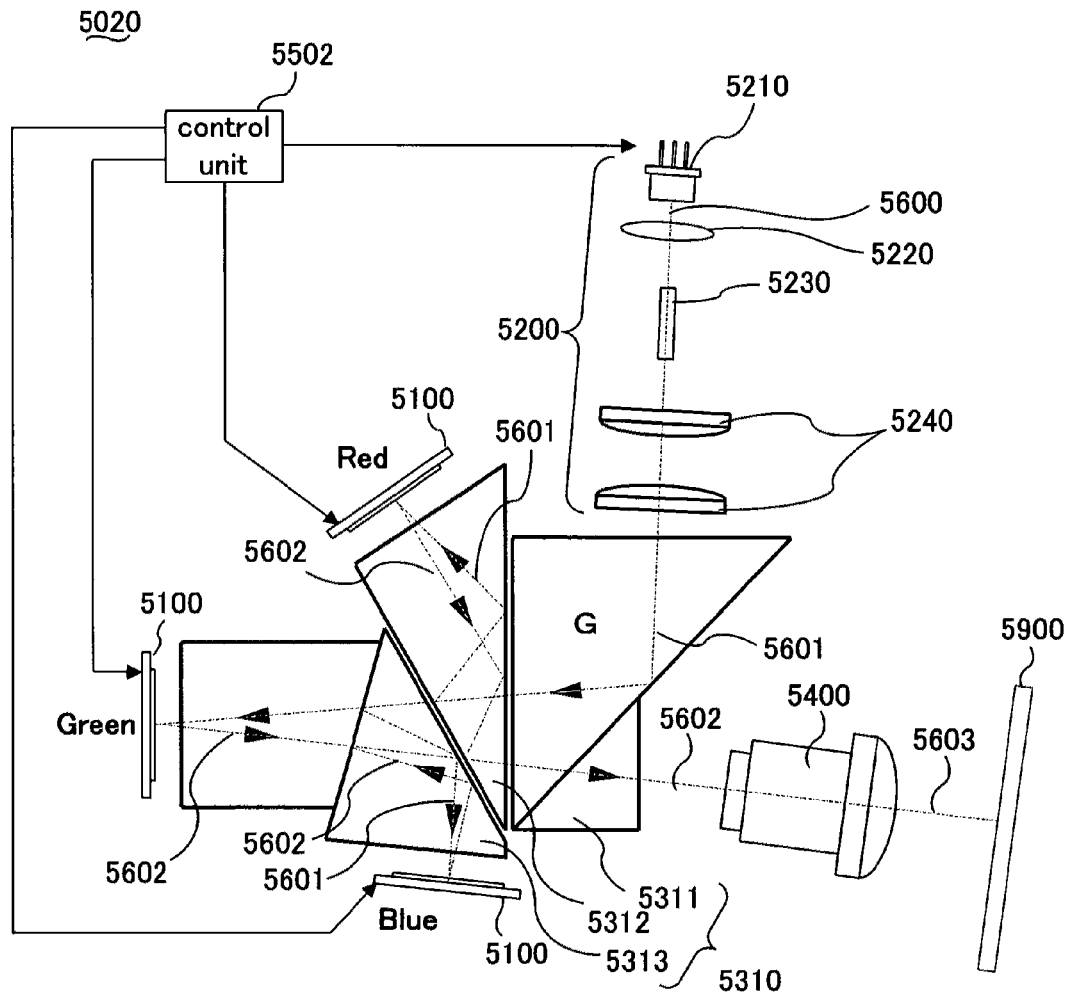
FIG. 12B is a conceptual diagram showing the configuration of a multi-panel projection apparatus according to the embodiment of the present invention.

FIG. 12B is a conceptual diagram showing the configuration of a multi-panel projection apparatus according to another preferred embodiment of the present invention. The projection apparatus 5020 is generally known as a multiple-plate projection apparatus comprising a plurality of spatial light modulators 5100, which is the main difference from the above described projection apparatus 5010. Further, the projection apparatus 5020 comprises a control unit 5502 in place of the control unit 5500.

The projection apparatus 5020 includes a plurality of spatial light modulators 5100, and further includes a light separation/synthesis optical system 5310 between the projection optical system 5400 and each of the spatial light modulators 5100.

The light separation/synthesis optical system 5310 includes a TIR prism 5311, a prism 5312, and a prism 5313.

The TIR prism 5311 has the function of directing the illumination light 5600, incident from the side of the optical axis of the projection optical system 5400, to the spatial light modulator 5100 as incident light 5601.

The prism 5312 has the functions of separating red (R) light from an incident light 5601, incident by way of the TIR prism 5311, making the red light incident to the red light-use spatial light modulators 5100, and directing the reflection light 5602 of the red light to the TIR prism 5311.

Likewise, the prism 5313 has the functions of separating blue (B) and green (G) lights from the incident light 5601, incident by way of the TIR prism 5311, making them incident to the blue color-use spatial light modulators 5100 and green color-use spatial light modulators 5100, and directing the reflection light 5602 of the green light and blue light to the TIR prism 5311.

Therefore, the spatial light modulations of the three colors R, G and B are simultaneously performed at three spatial light modulators 5100, and the reflection lights resulting from the respective modulations are projected onto the screen 5900 as the projection light 5603, by way of the projection optical system 5400, and thus a color display is carried out.

The image projection system may be implemented with various modifications by using different kinds of conceivable light separation/synthesis optical system and is not limited to the light separation/synthesis optical system 5310.

Also note that FIG. 12B exemplifies the case of the light separation/synthesis optical system carrying out the light separation/synthesis in accordance with differences in wavelengths; the light separation/synthesis may alternatively be carried out in accordance with differences in polarizing direction using a laser light source, or the like, emitting a polarized light.

Further, as exemplified in FIG. 12B, the separation and synthesis of the lights of respective colors are performed in different regions on the same plane on the basis of the difference between the direction of the incident light to the spatial light modulator 5100 and the direction of the reflection light from the spatial light modulator 5100.

Preferably, the incident light 5601 crosses a surface on which the reflection light 5602 is synthesized orthogonally, or crosses the reflection light 5602 synthesized by the light separation/synthesis optical system, as exemplified in FIG. 12B.

The following description is for the deflection angle of the mirror device implemented as a spatial light modulator in a projection apparatus according to the present embodiment. Furthermore, a description of an image projected in the projection apparatus according to the present embodiment is provided.

First is a description of the deflection angle and drive voltage of the mirror device.

In a mirror device, it is possible to prevent undesirable light from being projected by deflecting the mirror at a large deflection angle, for example, between minus 13 degrees and plus 13 degrees. For example, it is possible to change over between the ON state, in which the reflection light is incident to a projection lens, and the OFF state, in which the reflection light is not incident to the projection lens. This operation makes it possible to improve the contrast of an image to be projected.

Note that in reference to the deflection angle of a mirror in the present specification document, the deflection angle is defined as "0" degrees when the mirror is horizontal, the angle in the clockwise direction (CW) is defined as plus (+), and that in the counterclockwise direction is defined as minus (−).

Meanwhile, when using a light flux, such as a laser light source, which has a small diffusion angle of light from the light source and which is approximately parallel to the light source, the numerical aperture NA of an illumination light flux can be reduced on the basis of the relationship of etendue, and therefore a mirror size can be reduced. As a result, it is possible to obtain a configuration avoiding the mutual interference between the projection light path and illumination light path, and therefore, for example, the deflection angle of the mirror can be reduced to ±10 degrees or smaller, 10 degree or less for an angle in the CW direction and −10 degrees or more for an angle in the CCW direction. Thus, deflecting between the ON state and OFF state can be achieved with a reduced deflection angle of the mirror. Moreover, adopting a smaller deflection angle of the mirror thus reducing the degradation of contrast in the display images.

Furthermore, reducing the deflection angle to, for example, ±10 degrees or smaller, makes it possible to lower the drive voltage resulting from shortening the distance between the address electrode and mirror on a device substrate.

As an example, when the deflection angle of the mirror in the ON state is +13 degrees and the deflection angle in the OFF state is −13 degrees, with a drive voltage required for deflecting the mirror being 16 volts, a reduction in the deflection angles to ±6 degrees, respectively, decreases the distance between the mirror and address electrode by half. Here, the electrostatic force (i.e., a coulomb force) functioning between the address electrode and mirror when deflecting the mirror is inversely proportional to the second power of the distance between the address electrode and mirror. Therefore, a drive voltage applied to the address electrode will be one quarter of the voltage applied in the case where the deflection angle of the mirror is ±13 degrees. That is, 4 volts. The reduction of the deflection angle of the mirror to ±10 degrees or smaller makes it possible to lower the drive voltage applied to the address electrode required to deflect the mirror.

The drive voltage applied to the address electrode is also reduced when the mirror size is reduced to about 4 μm to 9 μm. This configuration makes it possible to thin the circuit-wiring pattern of the control circuit for controlling the mirror. The thickness of the circuit-wiring pattern can be reduced from about 0.25 μm to 0.13 μm. Consequently, as the deflection angle of the mirror is reduced to ±10 degrees or smaller, a drive voltage of 5 volts or lower applied to the address electrode is sufficient to control the mirror. The driving voltage is lower than that used in the conventional technique. Thereby, the resistance of a transistor as part of the address electrode can also be reduced. The following description is for the deflection angle of a mirror device and a laser light source.

A laser light source for irradiating the light onto a mirror device preferably has a numerical aperture NA of 0.07 to 0.14 and emitting the laser light at no less than 3 watts.

Such a laser light source projects an illumination light flux with a small diameter and a long depth of focus, and therefore makes it possible to increase degrees of freedom to configure the optical path in the optical system inside a projection apparatus. More flexibility is also available in the layout of the optical components within the projection apparatus. Further, it allows a change in the light path lengths between each laser light source and mirror device.

The numerical aperture NA has a large influence on the usage efficiency of light and the resolution of a projection optical system. The numerical apertures NA of an illumination light flux and of a projection light flux in the case of where a mercury lamp, or other similar light source, is employed is between about 0.18 and 0.24. In contrast, when employing a laser light source, the numerical aperture NA can be configured to be the same as or smaller than that of a system using a mercury lamp. For example the NA can be configured to be about 0.22 for a 13-degree deflection angle of a mirror (same as the case of using a mercury lamp), or the NA can be configured to be smaller, depending on the deflection angle of the mirror, such as the NA being 0.14 for a 8-degree deflection angle and the NA being 0.07 for a 4-degree deflection angle. Further, when employing a laser light source, the optical system can be set so as to form a light flux with the numerical aperture being 0.07 to 0.14 in comprehension? Corresponding to? of a decrease in resolution and modulation transfer function (MTF). As a result, the usage efficiency of light, when employing a laser light source, is much higher than when employing a mercury lamp and the like. Note that a laser light source rated at about 3 watts to 5 watts is employed for a rear projection system, and a high-output laser light source rated at 10 watts is employed for a theater-use projection apparatus.

Yet another reason for using a laser light source is the possibility of reducing the problem of etendue by irradiation with a single wavelength, with highly coherent beams and substantially parallel light flux. Therefore, the brightness of light can be increased by increasing the intensity, per unit area, of the laser light irradiated onto a mirror device, and therefore the brightness of light will not be reduced even if the mirror array of the mirror device is miniaturized.

The following description explains the relationship between the deflection angle of a mirror device, the numerical aperture NA of a light source, and the F-number of a projection lens.

The resolution of an image projected by the projection apparatus is determined by the size of a mirror, the F number of a projection lens, the numerical aperture NA of a light source, the coherency of a light flux, et cetera.

An image project system uses a laser light source can project a bright image by maintaining the resolution with the numerical aperture NA of an illumination light flux as 0.1 to 0.04 because the degradation in the high frequency component of the spatial frequency of a laser light is small. Referring to FIGS. 2A to 2C for the relationship between the etendue and the brightness of the image. Furthermore, it is possible to maintain the resolution of a projection image even with the F-number of the projection lens increased to between 5 and 12, larger than that of the case of using a mercury lamp or other similar light sources.

The space between the illumination light and projection light flux can be reduced by reducing the deflection angle of the mirror device to match the F number of the illumination light flux and projection light flux. The system can also have a layout with a shorter distance between the illumination light flux and projection light flux. If the deflection angle of the mirror is designated at $\theta$, the numerical aperture is expressed as $NA=\sin\theta$, and the F-number is set at F-number=½*NA, and thereby an approximate optical system analysis may be conveniently carried out. With the equations described above for carrying out an approximate analysis, appropriate F-numbers may be adjusted corresponding to the deflection angle $\theta$ of a mirror and the numerical aperture NA. Some exemplary analysis results are listed below:

When the deflection angle θ of a mirror is ±4 degrees, the NA of an obtainable light flux is 0.070, and the preferable F-number for a projection lens can possibly be 7.2.

When the deflection angle θ of a mirror is ±5 degrees, the NA of an obtainable light flux is 0.087, and the preferable F-number for a projection lens can possibly be 5.7.

When the deflection angle θ of a mirror is ±7 degrees, the NA of an obtainable light flux is 0.122, and the preferable F-number for a projection lens can possibly be 4.1.

When the deflection angle θ of a mirror is ±9 degrees, the NA of an obtainable light flux is 0.156, and the preferable F-number for a projection lens can possibly be 3.2.

When the deflection angle θ of a mirror is ±13 degrees, the NA of an obtainable light flux is 0.225, and the preferable F-number for a projection lens can possibly be 2.2.

Based on the approximate analysis results, when the F number for a projection lens is determined to be 2.2 for an illumination light flux of which the numerical aperture NA emitted by, for example, a mercury lamp is 0.225, the deflection angle of a mirror element is preferably designated at ±13 degrees. Therefore, in a rear projection system using a mercury lamp, the numerical aperture NA is between 0.17 and 0.21, and the F number for a projection lens to be used is designated between 2.4 and 2.8, and therefore, the deflection angle of a mirror element in a mirror device is between ±10 degrees and ±13 degrees.

Specifically, the meaning of the phrase "between ±10 degrees and ±13 degrees" means "between 10 degrees and 13 degrees" for an angle in the clockwise (CW) direction and "between −13 degrees and −10 degrees" for an angle in the counter-clockwise (CCW) direction, in the present specification document.

Meanwhile, when using an illumination light flux in which the numerical aperture emitted from a laser light source is between 0.10 and 0.04, the F-number of a projection lens can be increased to between 5 and 12, larger than when using a mercury lamp. Associated with this, the deflection angle of mirror can be reduced to between ±2.3 degrees and ±5.7 degrees.

By assuming that there is no aberration of the light projected from the light source, the relationship between an appropriate F number for a projection lens and the deflection angle of a mirror can be obtained for a mirror with specific pixel pitch by applying the above described relational expression of resolution.

Figure 1:
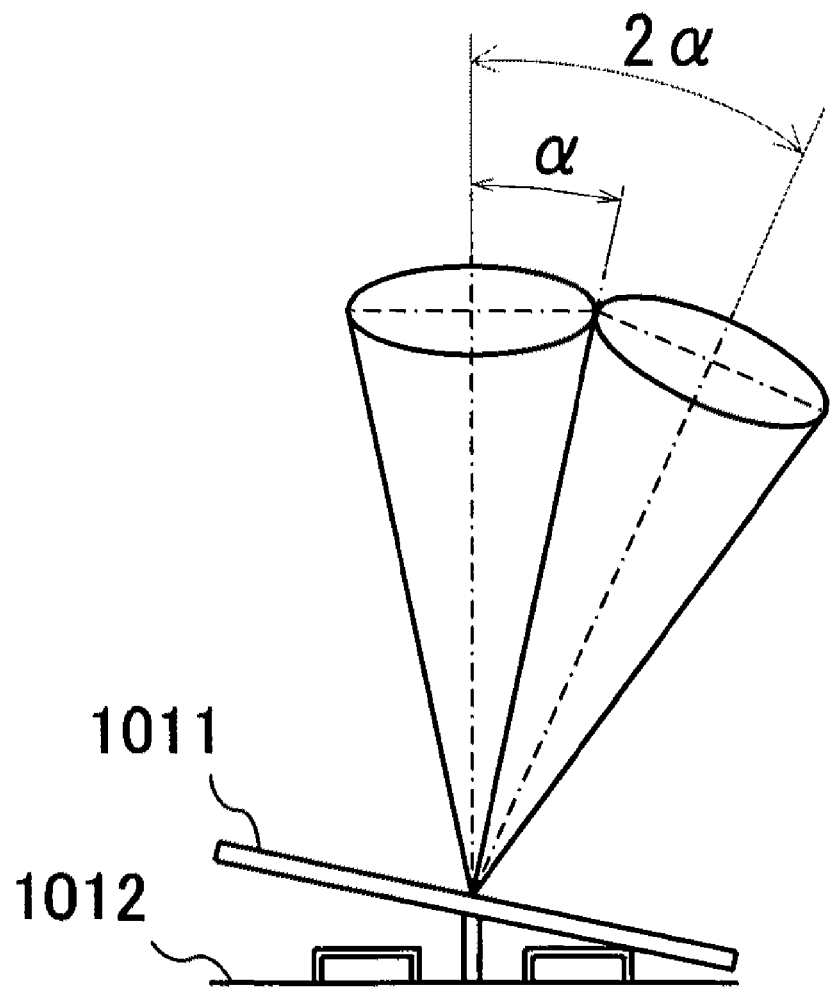
FIG. 1 is a diagram for showing the relationship among the numerical aperture NA1 of an illumination light path, the numerical aperture NA2 of a projection light path, and the tilt angle α of a mirror.

A project system implements a laser light source with a coherent characteristic as that shown in FIGS. 12A and 1B makes it possible to project an image by using an optical device with a larger F number (i.e., narrower expansion of light flux) than the case of using a conventional optical device.

A projection apparatus that implements a laser light source to project a light with a coherent characteristic, enables an optical design with a light flux of f/10 as described above. The projection system further allows a flexibility to set the deflection angle of the mirror of a spatial light modulator at about ±3 degrees CW in relation to the initial state of the mirror.

The following description is for the setup of the deflection angle of the mirror element of a mirror device when a light source that has a coherent characteristic such as a laser light source is used in solving the problem of etendue described above. Note that a mirror device can be miniaturized and the deflection angle of the mirror can be reduced, as described above, when a light source possessing a coherent characteristic is used.

Figure 13:
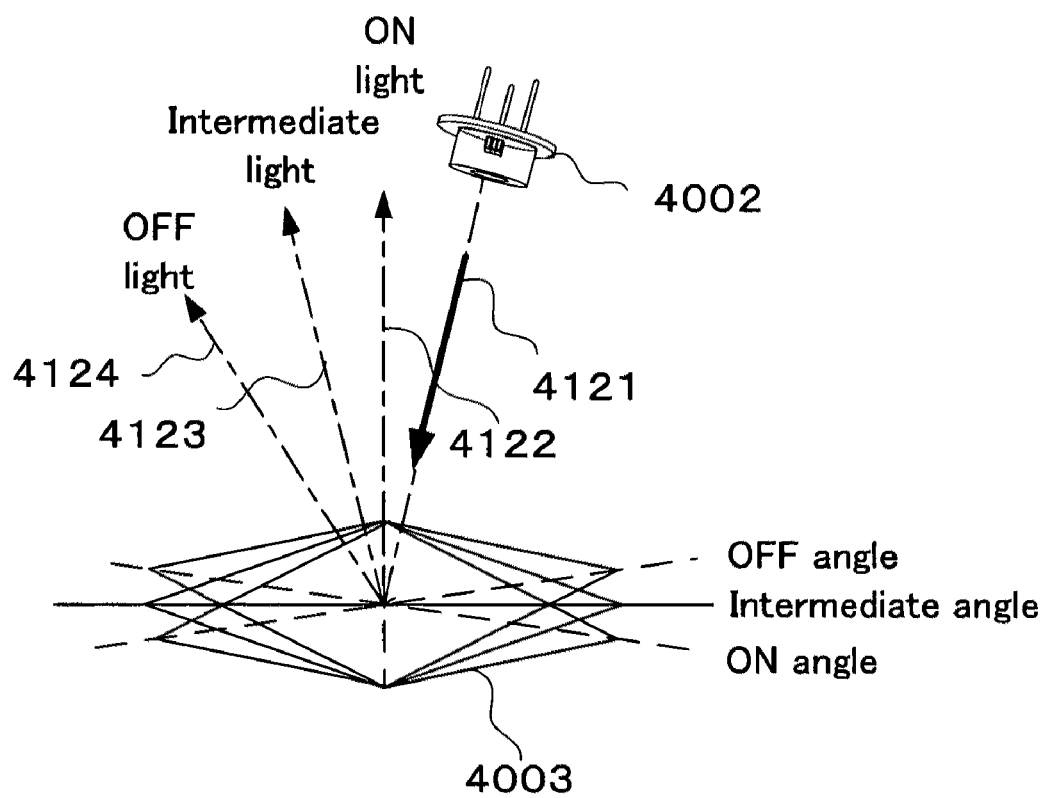
FIG. 13 illustrates the relationship between the deflection of the mirror shown in FIG. 3 and the reflecting direction of an illumination light.

FIG. 13 illustrates the relationship between the deflection of a mirror and the reflecting direction of an illumination light reflected from the mirror elements of FIG. 3.

When the mirror 4003 is tilted CW, the deflection angle of the mirror 4003 is in the ON light state, i.e., the mirror is controlled to deflect to an ON angle and the illumination light is reflected to an optical axis 4122 of the ON light for projecting the entirety of light into the projection optical system.

When the mirror 4003 is in the initial state, the deflection angle of the mirror 4003 is in an intermediate light state, in which the illumination light is reflected to an optical axis 4123 of the intermediate light with a portion of light reflected onto the projection optical system.

When the mirror 4003 is tilted CCW, the deflection angle of the mirror 4003 is in the OFF light state, i.e., the mirror is controlled to deflect to an OFF angle and the illumination light is reflected to an optical axis 4124 of the OFF light and no light is projected into the projection optical system.

The aim of the present embodiment is to secure the projection optical system so that none of the OFF light is allowed to enter the system. This necessitates setting the deflection angle of the mirror 4003 to be larger than a conventional angle for the OFF light state. Increasing the mirror deflection angle larger than the conventional deflection angle makes it possible to place the OFF light at a distance further from the projection optical system and, accordingly, prevent diffracted light or scattered light generated by the OFF light from entering the projection optical system. As a result, the image quality and contrast of the projected image are improved.

Figure 14A:
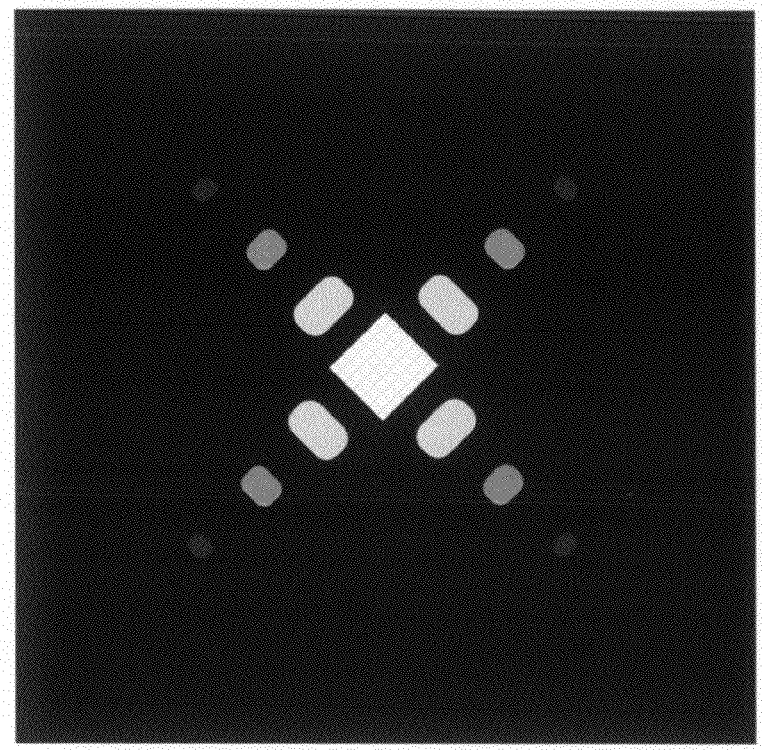
FIG. 14A is an illustrative diagram showing diffraction light generated when the light is reflected by a mirror.
Figure 14B:
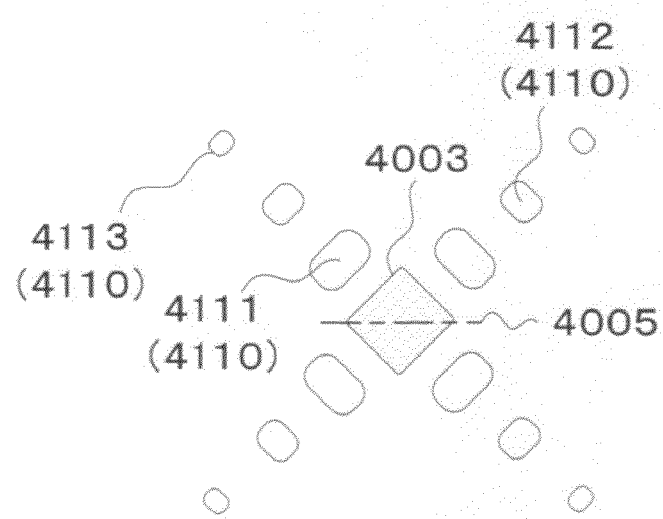
FIG. 14B is an illustrative diagram showing diffraction light generated when the light is reflected by a mirror.

FIGS. 14A and 14B are diagrams for showing the diffracted light patterns generated when the light is reflected by a mirror of a spatial light modulator.

As shown in the figures, the diffracted light is generated as a result of irradiating the light onto a mirror shown in the center of the diagrams, and the diffracted light 4110 spreads in directions perpendicular to the four sides of the mirror 4003 as the primary diffracted light 4111, the secondary diffracted light 4112, the tertiary diffracted light 4113, and so on. As shown in FIG. 14A, the light intensity decreases gradually with the primary diffracted light 4111, secondary diffracted light 4112, tertiary diffracted light 4113, and so on. When using a laser light source, the coherence of light is improved by the uniformity of the wavelength of the laser light, distinguishing the diffracted light 4110. Note that the diffracted light 4110 also expands to the depth direction of the mirror 4003 in three dimensions.

The spatial light modulator 4000 shown in FIG. 3 can be configured to set the diagonal direction of the mirror 4003 as the deflection axis to prevent the diffracted light 4110 from entering the projection optical system. This configuration prevents extraneous light including the diffracted light 4110 from entering the projection optical system, thereby improving the contrast of a projected image.

Meanwhile, the resolution of a projected image of a projection apparatus is determined by parameters such as the size of a mirror, the F-number of a projection lens, the numerical aperture NA of a light source, and the coherence of a light flux. Therefore, an optimal deflection angle of the mirror 4003 can be determined by taking into consideration of these factors.

The following description explains the relationship between an illumination light and the flux of reflection light for a specific setting of a deflection angle.

Figure 15:
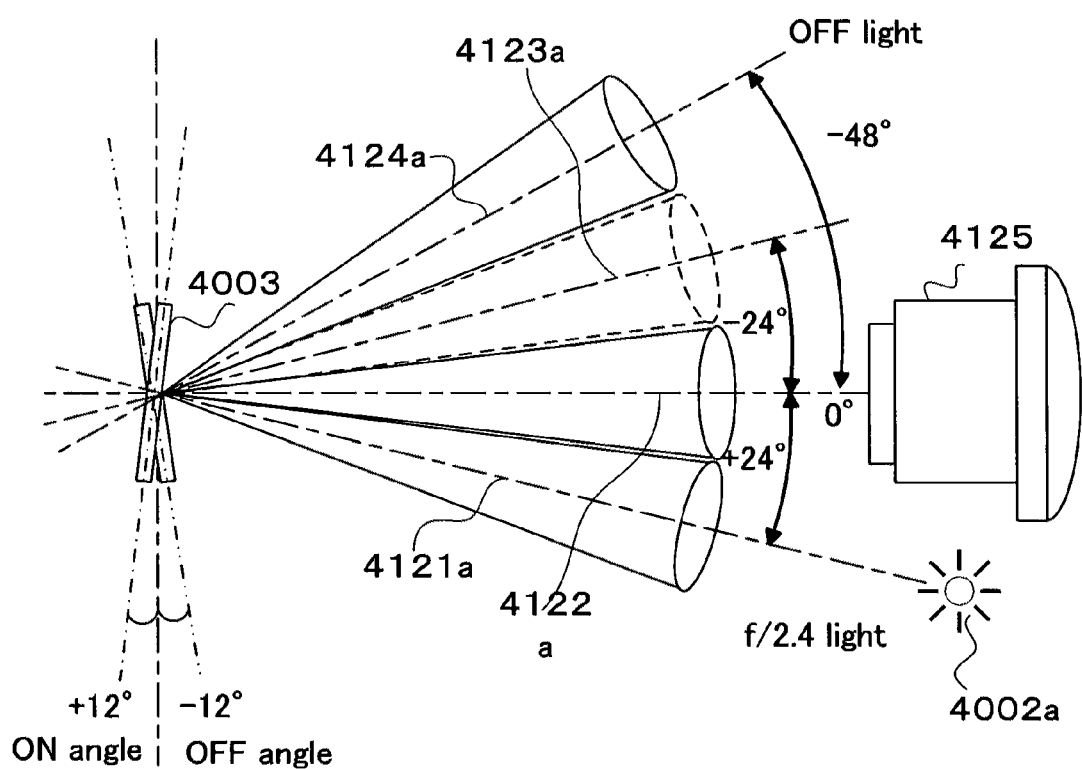
FIG. 15 is an illustrative cross-sectional diagram depicting a situation in which an f/2.4 light flux is reflected by a conventional spatial light modulator for which the deflection angles of the ON light state and OFF light state of a mirror are set at ±12 degrees, respectively.

Referring to FIG. 15 for a description of the conventional theoretical settings of the deflection angle of a mirror. FIG. 15 shows cross-sectional diagram for delineating a situation of a discharge lamp light source projects an f/2.4 light flux. A conventional spatial light modulator with the deflection angles of the ON light state and OFF light state of a mirror are set at ±12 degrees respectively reflects the light. is reflected by.

Conventionally, with the deflection angle of a mirror in the ON state being set at +12 degrees, an angle of 24 degrees is provided between the optical axis 4122a of the ON light and the optical axis 4121a of the illumination light. The ON light enters a projection optical system 4125 without, theoretically, overlapping with the illumination light output from a discharge lamp light source 4002a.

Furthermore, The conventional system has the deflection angle of the mirror 4003 in the initial state being set at "0" degrees, an angle of −24 degrees is provided between the optical axis 4123a of the light reflected by the mirror 4003 in the initial state and the optical axis 4122a of the ON light. The reflected light does not theoretically overlap with the ON light and so that no light enters the projection optical system 4125.

The conventional spatial light modulator is structured such that the deflection angle of a mirror rotates (i.e., swings) in equal swinging angles CW and CCW about the initial state of the mirror as the center, and therefore the deflection angle of mirror in the OFF state is −12 degrees in relation to the deflection angle +12 degrees of mirror in the ON state.

At the angle in the OFF state, an angle of −48 degrees is provided between the optical axis 4124a of the OFF light and the optical axis 4122a of the ON light so that not only does the light flux of the OFF light overlap with the light flux of the ON light, theoretically, but also the OFF light does not overlap with the light flux reflected by the mirror 4003 in the initial state. Configuring as such prevents the diffraction light or scattered light generated by the mirror from entering the projection optical system 4125, while the usage efficiency of f/2.4 light output from the discharge lamp light source is theoretically optimized.

In the present invention, it is no longer necessary to consider and optimize the light usage efficiency since the project system uses a coherent light source 4002, such as a laser light source. In addition, a deflection angle may be set larger than the theoretically calculated conventional deflection angle of the mirror. Further, by increasing the deflection angle of mirror, it is possible to more reliably prevent the diffraction light or scattered light generated by the mirror in the OFF light state and OFF angle from entering the projection optical system. As a result, the contrast of the projected image is improved.

Further, when using a laser light source, the F number of a projection lens can be increased, and the deflection angle of mirror can be set smaller than in the case of using a discharge lamp light source, as described above.

The following description provide an exemplary embodiment to illustrate the setting of the deflection angle of a mirror element of the present embodiment with reference to FIGS. 16A, 16B, 17, 18A, 18B, 19, 20A, 20B, 21A and 21B. Note that the present embodiment designates the conventional optical axis 4123a of the light reflected by the mirror 4003 in the initial state as the optical axis 4123 of an intermediate light, that is, a portion of the light enters the projection optical system.

When using a laser light source, as the light source 4002 possessing a coherent characteristic, the numerical aperture NA of the light flux emitted from the laser light source configured as described above can be reduced, and therefore the deflection angle of the mirror 4003 can be set at smaller angle than in the conventional case. That is, the angle may be set at ±3 degrees, in the ON light state and OFF light state, respectively. In the conventional case, the numerical aperture NA is set at 10.

Figure 16A:
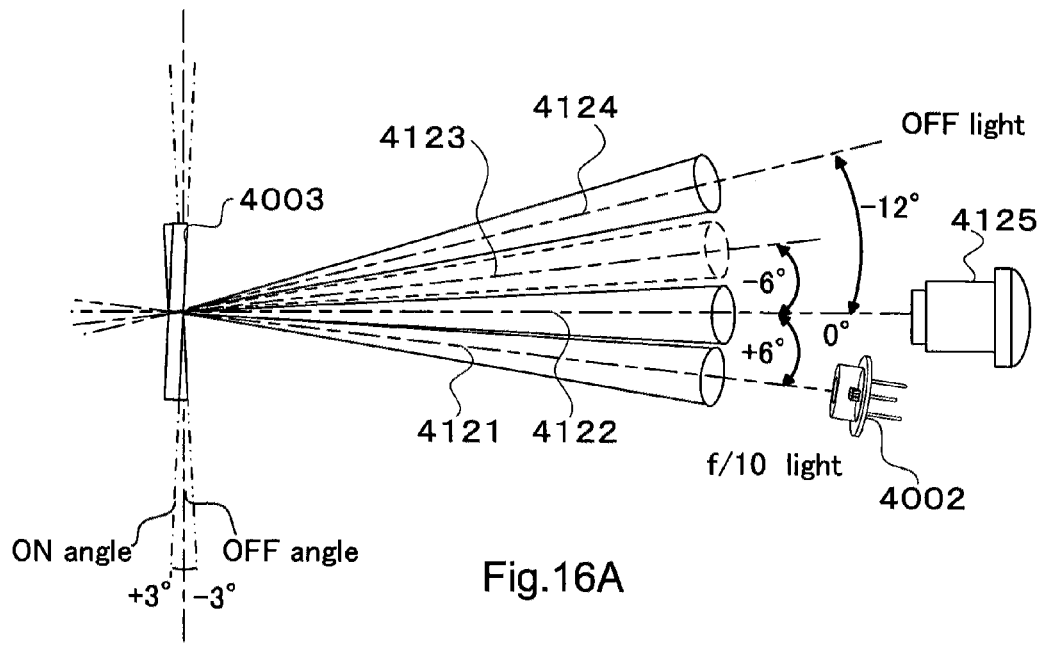
FIG. 16A is an illustrative cross-sectional diagram depicting a situation in which an f/10 light flux, which possesses a coherent characteristic, is reflected by a spatial light modulator for which the deflection angles of the ON light state and OFF light state of a mirror are set at ±3 degrees, respectively.

FIG. 16A is cross-sectional diagram for delineating a situation a spatial light modulator reflects an f/10 light flux that has a coherent characteristic with deflection angles of the ON light state and OFF light state of a mirror set at ±3 degrees, respectively.

FIG. 16A shows a configuration with the deflection angle of mirror in an ON light state set at +3 degrees and providing an angle of +6 degrees between the optical axis 4122 of an ON light and the optical axis 4121 of the illumination light. The ON light enters into the projection optical system 4125. There is no overlap between the light flux of the ON light and the illumination light flux. Further, the image projecting system provides an angle of −6 degrees between the optical axis 4123 of an intermediate light and the optical axis 4122 of the ON light, so that the light flux of the intermediate light enters the projection optical system 4125 without an overlap between the light flux of the intermediate light and that of the ON light. Further, the image projecting system is configured with the deflection angle of the mirror 4003 in an OFF state set at −3 degrees and providing an angle of −6 degrees between the optical axis 4124 of an OFF light and the optical axis 4123 of the intermediate light. The light flux of the OFF light does not overlap with either the light flux of the ON light or that of the intermediate light. There is an angle of −12 degrees between the optical axis 4124 and the optical axis 4122 of the ON light.

The image projecting system is configured to more reliably prevent the diffraction light or scattered light, generated by the mirror producing an OFF light and tilting in an OFF angle, from entering the projection optical system 4125.

Figure 16B:
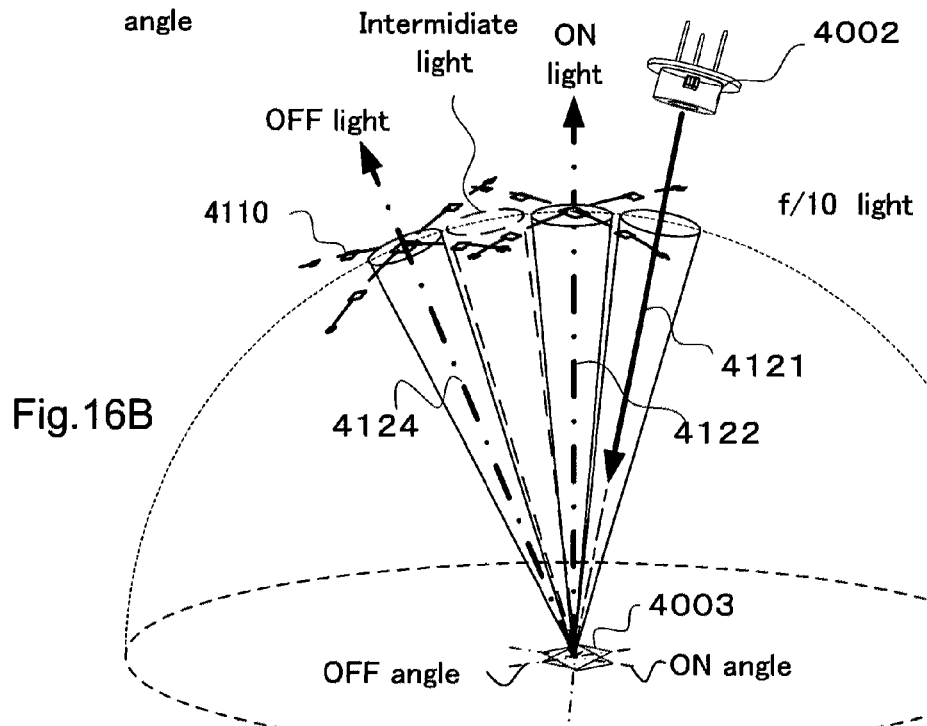
FIG. 16B is a diagram further showing an expansion of diffraction light by depicting, in three dimensions, the relationship between the deflection angle of the mirror and the light flux thereof shown in FIG. 16A.

FIG. 16B is a diagram for further showing an expansion of diffraction light by delineating the relationship along directions in three dimensions between the deflection angle of the mirror and the light flux of the configuration shown in FIG. 16A.

The diffraction light 4110 is generated perpendicularly to each side of the mirror 4003. The light does not overlap with the light path of an ON light since the deflection axis is set in the diagonal direction of the mirror 4003. Particularly, the diffraction light 4110 does not enter into the projection optical system since the diffraction light 4110 is generated when the mirror 4003 is in an OFF state and the OFF light does not overlap with the light path of the ON light. As a result, the extraneous diffraction light 4110 generated by the spatial light modulator reflecting incident light does not enter the projection optical system, and thereby the contrast of an image is improved. Further, the deflection angle of the mirror 4003 in the OFF state and ON state may be increased from the ±3 degree deflection angle shown in FIGS. 16A and 16B, in order to further improve the contrast.

Figure 17:
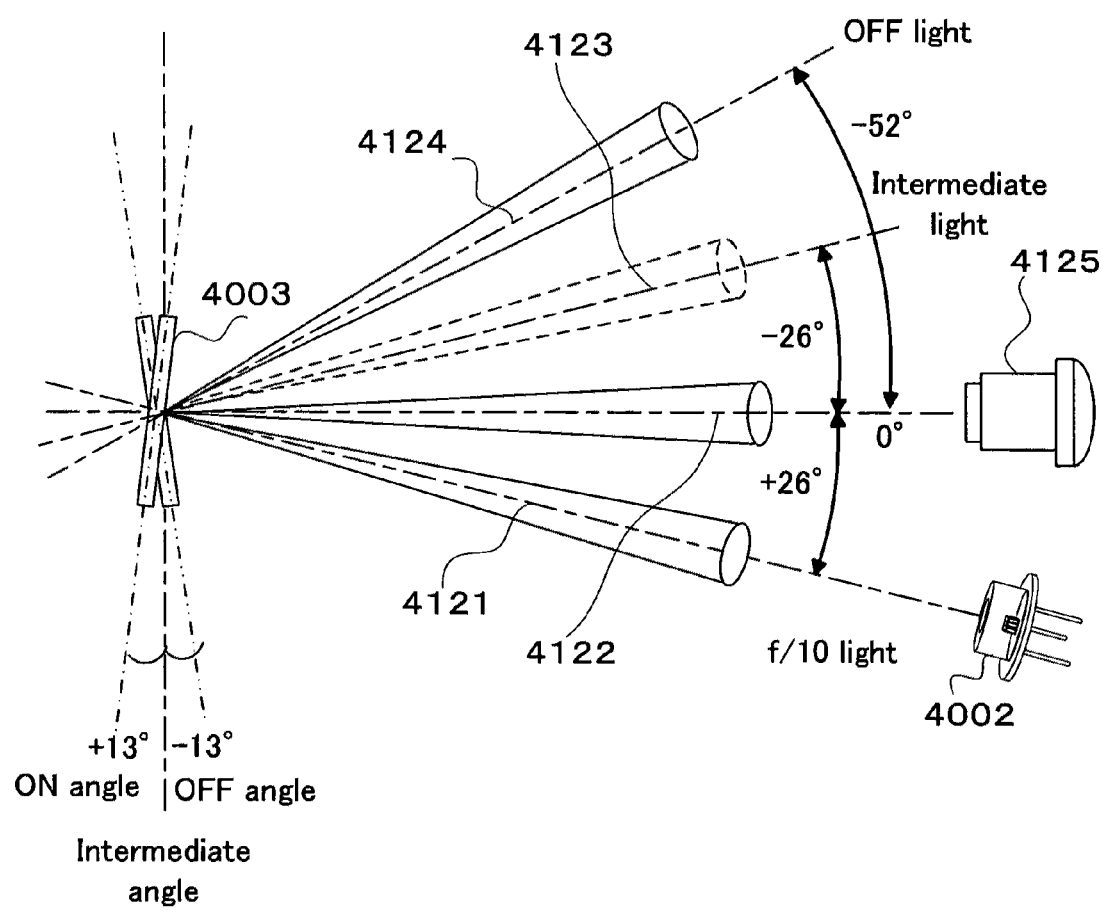
FIG. 17 is an illustrative cross-sectional diagram depicting a situation in which an f/10 light flux emitted from a light source, which possesses a coherent characteristic, is reflected by a spatial light modulator for which the deflection angles of the ON light state and OFF light state of the mirror shown in FIG. 16A are set at ±13 degrees, respectively.

FIG. 17 is a cross-sectional view of the deflected beam reflected from a spatial light modulator of an f/10 light flux emitted from a coherent light source such as a laser light source. FIG. 16A shows that the deflection angles of the ON light state and OFF light state of the mirror are set at ±13 degrees.

FIG. 17 shows the configuration of the deflected beams with the deflection angle of the mirror 4003 in the ON state having a larger angle at +13 degrees than the theoretically calculated angle, i.e., +3 degrees. The laser light source has a numerical aperture NA. The setting of such a deflection angle of the mirror designates the angle between the optical axis 4122 of the ON light and the optical axis 4121 of the illumination light as +26 degrees.

Further, the deflection angle of the mirror 4003 in an intermediate light state, at an intermediate angle, is set at "0" degrees. The setting of such a deflection angle of the mirror designates the angle between the optical axis 4123 of the intermediate light and the optical axis 4122 of the ON light, as −26 degrees.

Further, the configuration in FIG. 17 sets the deflection angle of the mirror 4003 in the OFF state larger, at −13 degrees, than the theoretically calculated angle, i.e., −3 degrees, from the numerical aperture NA of the laser light source. The setting of such a deflection angle of mirror designates the angle between the optical axis 4124 of the OFF light and the optical axis 4123 of the intermediate light as −26 degrees. That is, the angle between the optical axis 4124 of the OFF light and the optical axis 4122 of the ON light is −52 degrees.

As described above, each light flux can be clearly separated by using a coherent light source 4002 such as a laser light source that has a coherent characteristic and setting the deflection angle of the mirror 4003 larger than the conventional theoretically calculated deflection angle of the mirror 4003. As a result, it is possible to more reliably prevent the diffraction light and scattered light generated by a mirror producing an OFF light and tilting in an OFF angle from entering the projection optical system 4125. As a result, the contrast of an image is improved.

Further, by setting the deflection angle of mirror larger than a theoretically calculated value makes it possible to reduce the influence of the diffraction light to interfere with a projected image, even when the deflection axis of a mirror element are configured to direct to different orientations.

FIG. 16A shows the ranges of the deflection angle of the mirror 4003 in the OFF state and ON state. The deflection angle may be flexible set at any angle larger than the ±3-degree deflection angle.

Figure 18A:
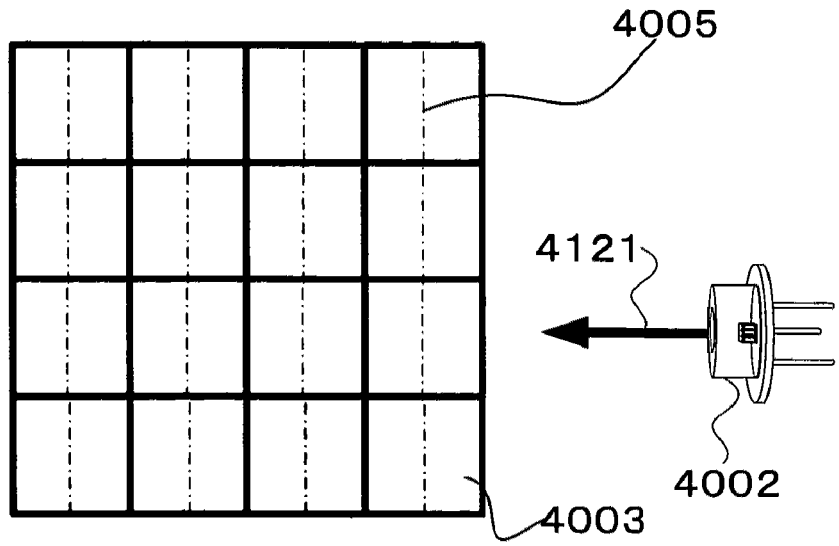
FIG. 18A is a top view diagram of a mirror array, with the deflection axis of the mirror shown in FIG. 3 changed.

FIG. 18A is a top view diagram of a mirror array, with the deflection axis of the mirror shown in FIG. 3 changed.

The difference between FIG. 18A and FIG. 3 is the position of the deflection axis 4005, on the center division line of the mirror 4003 in the former configuration, and in the diagonal direction of the mirror 4003 in the latter. Further in FIG. 18A, the optical axis 4121 of the illumination light, emitted from a coherent light source 4002 such as a laser light source, is directed towards the mirror 4003 in a direction perpendicular to the deflection axis.

Figure 18B:
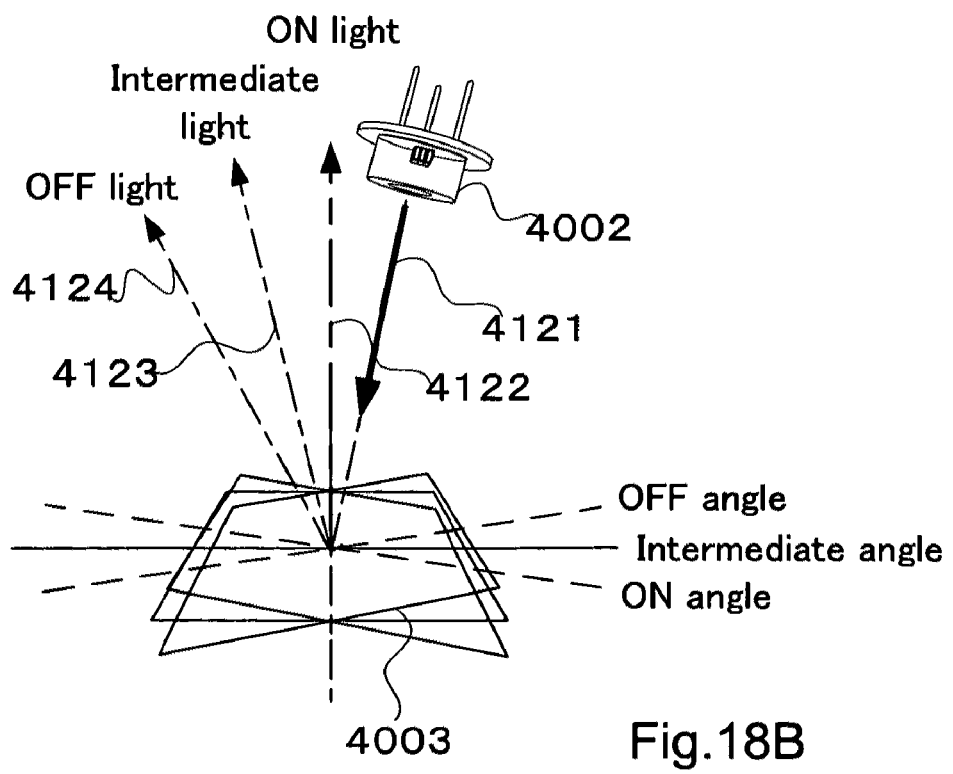
FIG. 18B illustrates the relationship between the deflection of the mirror and the reflecting direction of light in the configuration shown in FIG. 18A.

FIG. 18B illustrates the deflection of the mirror 4003 and the reflecting direction of light in the configuration shown in FIG. 18A. When the mirror 4003 is tilted CW, the deflection angle of the mirror 4003 is in an ON light state, in which the illumination light is reflected to the optical axis 4122 of the ON light, in which the entirety of light is incident towards the projection optical system. When the mirror 4003 is in the initial state, the deflection angle of the mirror 4003 is in an intermediate state, in which the illumination light is reflected to the optical axis 4123 of the intermediate light, in which a portion of light is incident towards the projection optical system. When the mirror 4003 is tilted CCW, the deflection angle of the mirror 4003 is in an OFF light state, in which the illumination light is reflected to the optical axis 4124 of the OFF light, in which no light is incident toward the projection optical system.

Figure 19:
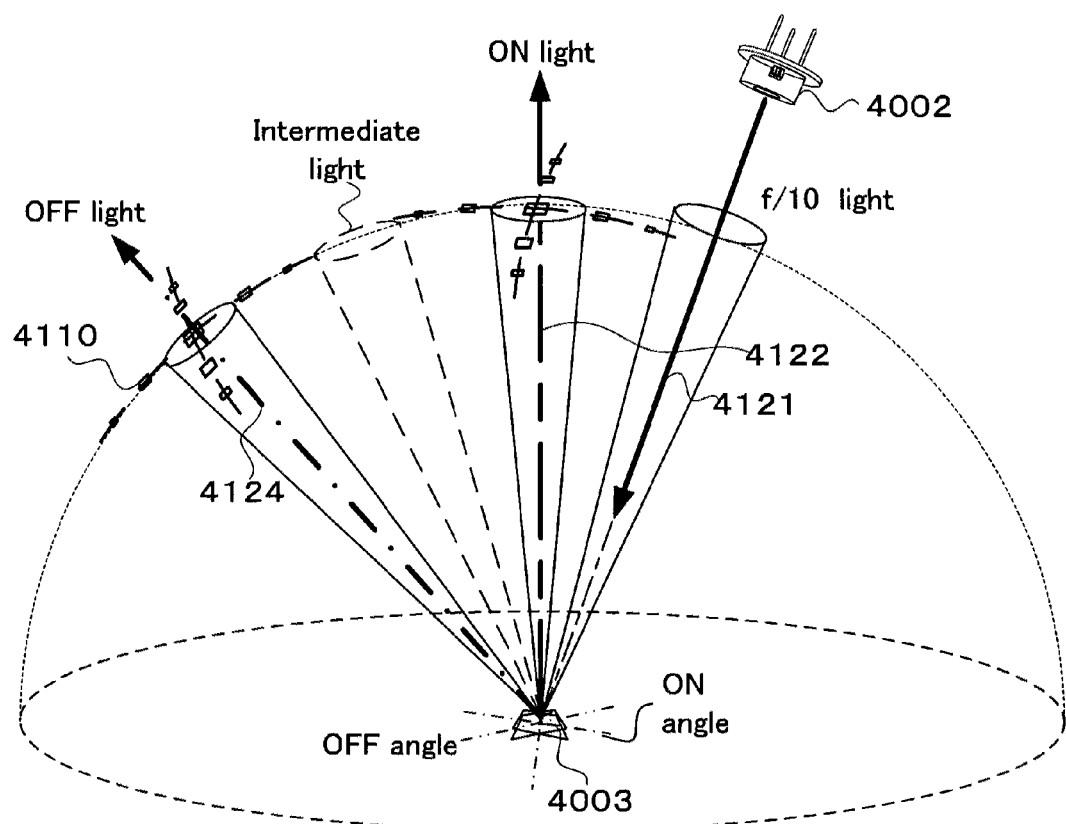
FIG. 19 is a diagram further showing the expansion of diffraction light by depicting, in three dimensions, the relationship between the deflection angle of the mirror shown in FIG. 17 and the light flux in the case in which the directions of deflection axis of a mirror element are changed as shown in FIG. 18A.

FIG. 19 is a diagram for further showing the expansion of diffraction light by illustrating in three dimensions, the relationship between the deflection angle of the mirror and the light flux shown in FIG. 17, in the case where the direction of the deflection axis of a mirror element is changed from that shown in FIG. 18A. The diffraction light of an OFF light is generated in a perpendicular direction to each side of the mirror and in the direction of the light path of an ON light, starting from the optical axis of the OFF light. There is a larger angle between the optical axis of the ON light and that of the OFF light. Therefore, the diffraction light 4110 does not enter the projection optical system. As a result, the extraneous diffraction light 4110 generated by the reflection of light by a spatial light modulator does not enter the projection optical system and thereby the contrast of the projected image is improved. Furthermore, the present embodiment does not require the deflection angle of an ON light state and that of an OFF light state are at equal angles, such as ±12 degrees, as in a conventional method. Accordingly, the following exemplary embodiment having different deflection angles between the ON light state of mirror and the OFF light state are disclosed as that shown in FIGS. 20A, 20B, 21A and 21B.

Figure 20A:
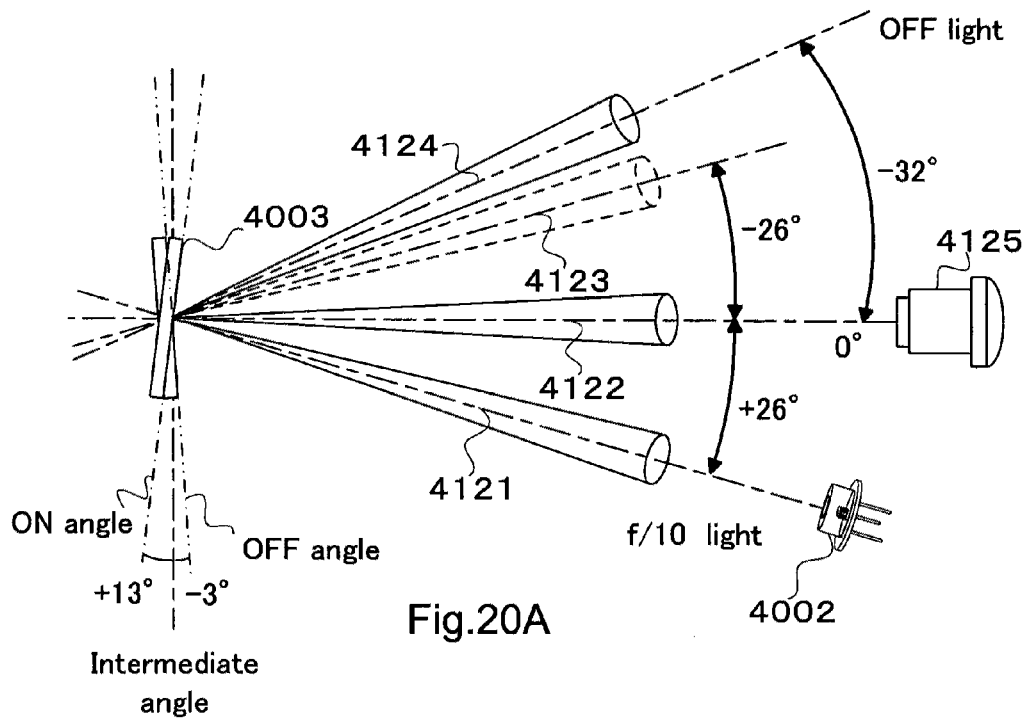
FIG. 20A is an illustrative cross-sectional diagram depicting a situation in which an f/10 light flux emitted from a light source, which possesses a coherent characteristic, is reflected by a spatial light modulator for which the deflection angles of the ON light state and OFF light state of a mirror are set at +13 degrees and −3 degrees, respectively.

FIG. 20A is a cross-sectional diagram for explaining a situation in which an f/10 light flux emitted from a coherent light source 4002 such as a laser light, is reflected by a spatial light modulator for which the deflection angles of the ON light state and OFF light state of a mirror are set at +13 degrees and −3 degrees, respectively.

With the deflection angle of the mirror 4003 in the ON light state set at +13 degrees, an angle of +26 degrees is provided between the optical axis 4122 of the ON light and the optical axis 4121 of the illumination light, so that the light flux of the ON light enters a projection optical system 4125 without overlapping with the illumination light flux.

With the deflection angle of the mirror 4003 in the intermediate state set at "0" degrees, an angle of −26 degrees is provided between the optical axis 4123 of the intermediate light and the optical axis 4122 of the ON light, so that the light flux of the intermediate light enters the projection optical system 4125 without overlapping with the flux of the ON light.

Furthermore, with the deflection angle of the mirror 4003 in the OFF state set at −3 degrees, an angle of −6 degrees is provided between the optical axis 4124 of an OFF light and the optical axis 4123 of the intermediate light, so that the flux of the OFF light does not overlap with either the flux of the ON light or the flux of the intermediate light.

Configuring the mirror element as described above makes it possible to more reliably prevent the diffraction light and scattered light, generated by a mirror producing the OFF light and tilting in the OFF angle, from entering the projection optical system 4125.

Figure 20B:
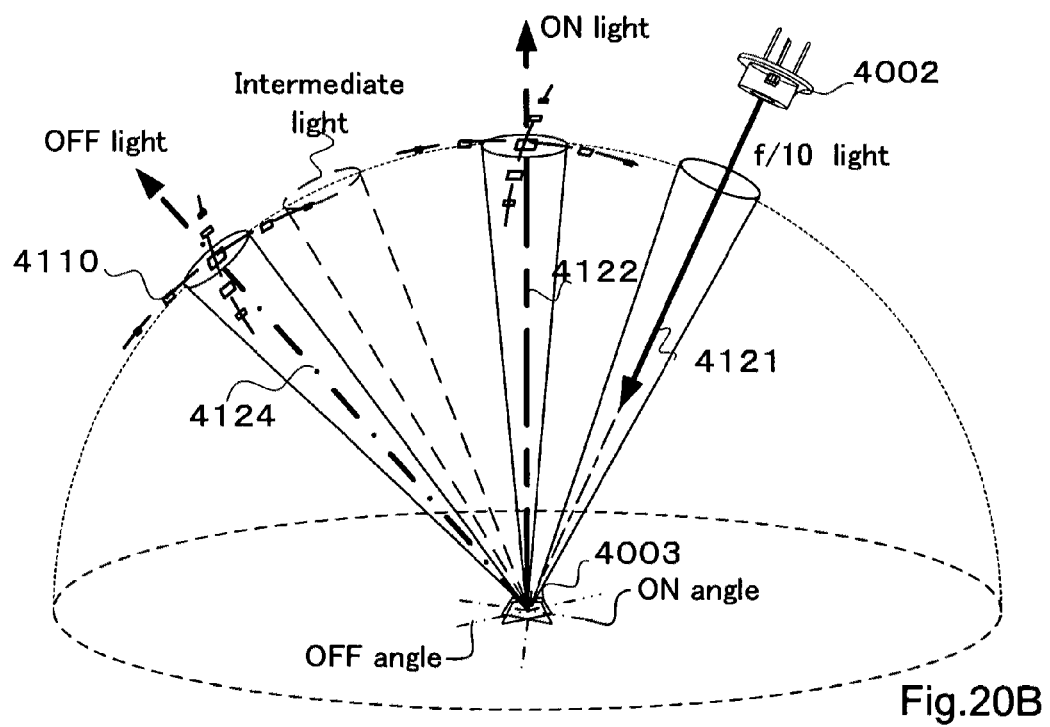
FIG. 20B is a diagram further showing an expansion of diffraction light by depicting, in three dimensions, the relationship between the deflection angle of the mirror and the light flux thereof shown in FIG. 20A.

FIG. 20B is a diagram for further showing an expansion of diffraction light by delineating, in three dimensions, the relationship between the deflection angle of the mirror and the light flux thereof shown in FIG. 20A.

Diffraction light 4110 is generated perpendicular to each side of the mirror 4003. The optical axis of the OFF light, which, in a conventional device using a discharge lamp light source, is designated in consideration of optimizing the usage efficiency of light, is close to the optical axis 4122 of the ON light, allowing the diffraction light 4110 to enter the projection optical system 4125. Accordingly it is possible to make the projected image brighter. The present embodiment, however, using a coherent light source such as a laser source that has a coherent characteristic, is enabled to set the optical axis 4124 of the OFF light and the optical axis 4122 of the ON light sufficiently far apart from the theoretical optical axis of the OFF light (i.e., the ±3-degree deflection angle of a mirror), and thereby the influence of the diffraction light 4110 on the projection optical system 4125 can be reduced. This in turn improves the contrast of an image.

Figure 21A:
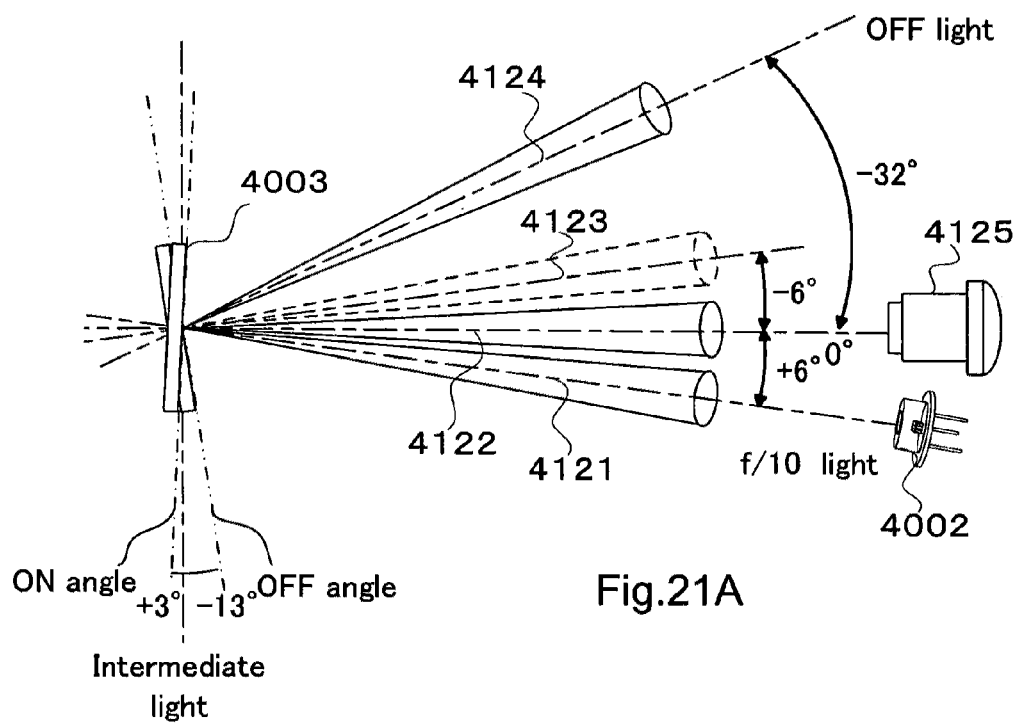
FIG. 21A is an illustrative cross-sectional diagram depicting a situation in which an f/10 light flux emitted from a light source, which possesses a coherent characteristic, is reflected by a spatial light modulator for which the deflection angles of the ON light state and OFF light state of a mirror are set at +3 degrees and −13 degrees, respectively.

FIG. 21A is an illustrative cross-sectional diagram delineating a situation in which an f/10 light flux emitted from a coherent light source, is reflected by a spatial light modulator for which the deflection angles of the ON light state and OFF light state of a mirror are set at +3 degrees and −13 degrees, respectively.

With the deflection angle of the mirror in the ON state set at +3 degrees, an angle of +6 degrees is provided between the optical axis 4122 of the ON light and the optical axis 4121 of the illumination light, so that the flux of the ON light enters a projection optical system 4125 without overlapping with the illumination light flux.

With the deflection angle of the mirror in the intermediate state set at "0" degrees, an angle of −6 degrees is provided between the optical axis 4123 of the intermediate light and the optical axis 4122 of the ON light, so that the flux of the intermediate light enters the projection optical system 4125 without overlapping with the flux of the ON light.

Furthermore, with the deflection angle of the mirror in the OFF state set at −13 degrees, an angle of −26 degrees is provided between the optical axis 4124 of the OFF light and the optical axis 4123 of the intermediate light, so that the flux of the OFF light does not overlap with either that of the ON light or that of the intermediate light. Configuring as such makes it possible to more reliably prevent the OFF light from entering the projection optical system 4125.

Figure 21B:
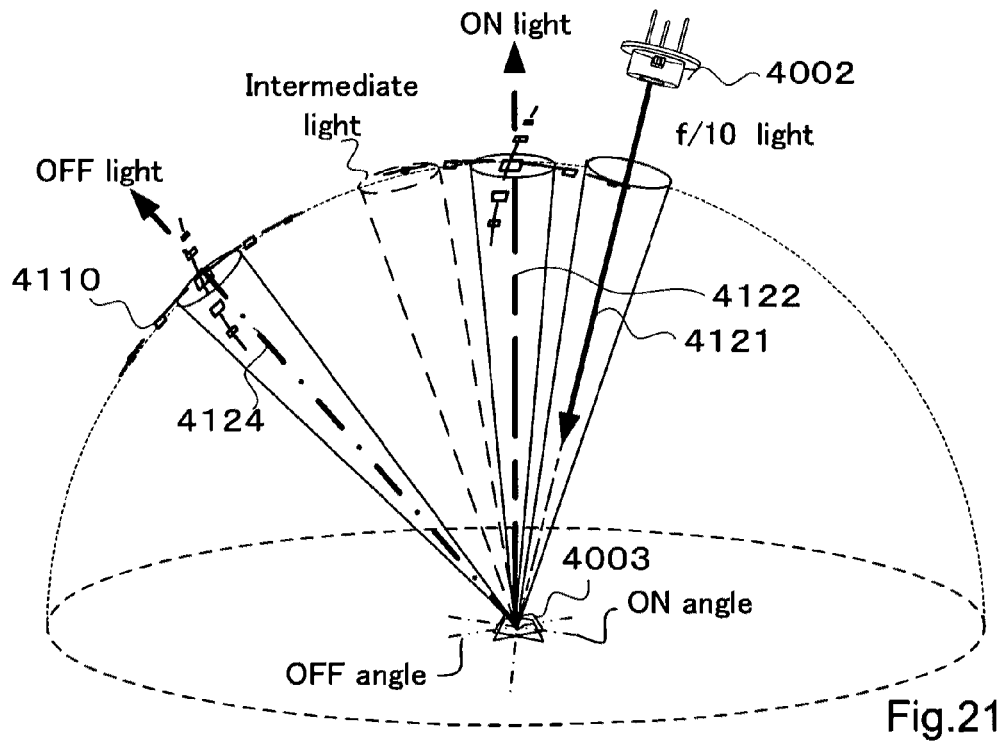
FIG. 21B is a diagram further showing an expansion of diffraction light by depicting, in three dimensions, the relationship between the deflection angle of the mirror and the light flux thereof shown in FIG. 21A.

FIG. 21B is a diagram further showing an expansion of diffraction light by delineating, in three dimensions, the relationship between the deflection angle of the mirror and the light flux thereof shown in FIG. 21A.

Diffraction light 4110 is generated perpendicular to each side of the mirror 4003. The optical axis of the OFF light, which, in a conventional device using a discharge lamp light source, is designated in consideration of optimizing the usage efficiency of light output, is close to the optical axis 4122 of the ON light, allowing the diffraction light 4110 to enter the light path of the ON light, leading to the projection optical system 4125. Accordingly it is possible to make the projected image brighter. The present embodiment, however, is enabled to set the optical axis 4124 of the OFF light and the optical axis 4122 of the ON light sufficiently far apart from the theoretical optical axis of the OFF light (i.e., the ±3-degree deflection angle of a mirror), and thereby the influence of the diffraction light 4110 on the projection optical system 4125 can be reduced. This in turn improves the contrast of an image.

As described thus far, the present embodiment includes a coherent light source such as a laser source having a coherent characteristic, allows an appropriate alternative setting of the deflection axis of the mirror, the deflection angle of the mirror in an ON light state and that of the mirror in an OFF light state. Preferably, the deflection angle of a mirror is set in such a manner that the mirror deflects clockwise (CW) in the range of ±3 degrees to ±13 degrees, in relation to the initial state. The deflection angle of the ON light state and that of the OFF light state may be asymmetrically set.

Meanwhile, a deflection angle may further be increased to reliably prevent the diffraction light and/or diffused light generated by the OFF light or by a mirror in the OFF angle from entering the projection optical system.

As described above, the projection apparatus according to the present embodiment makes it possible to suppress the influence, on the degradation of image quality, of the diffraction light and/or diffused light generated by the mirror device. The projection apparatus includes a mirror device for reflecting the light emitted from a light source. Further, the use of a coherent light source with parallel light flux, such as a laser light source, makes it possible to produce a more compact projection apparatus than that using a conventional discharge lamp light source.

Note that the present invention can be modified in various ways within the scope of the present invention and is not limited to the configurations exemplified in the above-described preferred embodiments.

Although the present invention has been described in terms of the presently preferred embodiment, it is to be understood that such disclosure is not to be interpreted as limiting. Various alternations and modifications will no doubt become apparent to those skilled in the art after reading the above disclosure. The present invention may be changed in various manners possible within the scope of the present invention, and is not limited to the configurations exemplified in the above-described embodiments. Accordingly, it is intended that the appended claims be interpreted as covering all alternations and modifications as fall within the true spirit and scope of the invention.

What is claimed is:

1. A projection apparatus comprising:
a light source for emitting an illumination light with an expansion angle to a mirror device having a plurality of micromirrors for modulating and reflecting the illumination light to an image projection optical system for displaying an image, wherein each of the micromirrors is controlled to oscillate between a minimum deflection angle and a maximum deflection angle and an angular difference between the minimum deflection angle and the maximum deflection angle is greater than the expansion angle α of the light flux of the illumination light according to a function relationship:

$$NA = n^* \sin \alpha,$$

where NA is the numerical aperture of the flux of the illumination light, and n is the reflectance.

2. The projection apparatus according to claim 1, wherein: the light source is a laser light source.

3. The projection apparatus according to claim 1, wherein: the mirror performs a deflecting operation on the basis of a deflection axis going through an approximate center of the present mirror.

4. The projection apparatus according to claim 1, wherein: the minimum deflection angle and the maximum deflection angle of the mirror are symmetrical between the clockwise (CW) direction and counterclockwise (CCW) direction relative to an initial state of the mirror.

5. The projection apparatus according to claim 1, wherein: the minimum deflection angle and the maximum deflection angle of the mirror are asymmetrical between the clockwise (CW) direction and counterclockwise (CCW) direction relative to the initial state of the mirror.

6. A color projection apparatus comprising:
a light source projects an illumination light as a light flux having an expansion angle;

a color separator for separating the light from the light source into a plurality of illumination lights with respective colors;

a plurality of mirror devices each comprising a plurality of deflecting mirrors controllable for deflecting and reflecting the illumination light toward an image projection direction to project and display an image;

a color synthesizer for synthesizing lights reflected by the mirrors toward the image projection direction as a synthesized light; and a projection optical system disposed approximately in the optical axis of the synthesized light, wherein an angle between a direction of the illumination light incident to the mirror device and the image projection direction is larger than the expansion angle α of the light flux of the illumination light according to a function relationship:

$$NA = n * \sin \alpha,$$

where NA is the numerical aperture of the flux of the illumination light, and n is the reflectance.

* * * * *